(12) United States Patent
Yan et al.

(10) Patent No.: US 8,621,601 B2
(45) Date of Patent: Dec. 31, 2013

(54) SYSTEMS FOR AUTHENTICATION FOR ACCESS TO SOFTWARE DEVELOPMENT KIT FOR A PERIPHERAL DEVICE

(75) Inventors: Mei Yan, Cupertino, CA (US);
Chieh-Hao Yang, Sunnyvale, CA (US);
Bahman Quwami, San Jose, CA (US);
Farshid Sabet-Sharghi, Los Altos Hills, CA (US); Patricia Dwyer, San Carlos, CA (US); Po Yuan, Milpitas, CA (US)

(73) Assignee: SanDisk Technologies Inc., Plano, TX (US)

( * ) Notice: Subject to any disclaimer, the term of this patent is extended or adjusted under 35 U.S.C. 154(b) by 837 days.

(21) Appl. No.: 12/124,456

(22) Filed: May 21, 2008

(65) Prior Publication Data

US 2009/0293118 A1     Nov. 26, 2009

(51) Int. Cl.
*G06F 21/00*     (2006.01)

(52) U.S. Cl.
USPC ............... 726/19; 705/55; 709/248; 380/44; 713/193

(58) Field of Classification Search
USPC ........................................ 726/19, 18
See application file for complete search history.

(56) References Cited

U.S. PATENT DOCUMENTS

| | | | |
|---|---|---|---|
| 6,983,460 B1 * | 1/2006 | Goire et al. ................ 717/175 |
| 7,036,020 B2 | 4/2006 | Thibadeau |
| 7,215,771 B1 | 5/2007 | Hamlin |
| 7,426,747 B2 | 9/2008 | Thibadeau |
| 7,493,656 B2 | 2/2009 | Goodwill et al. |
| 7,877,803 B2 * | 1/2011 | Enstone et al. ................ 726/23 |
| 8,051,053 B2 * | 11/2011 | Camiel ........................ 707/694 |
| 8,281,114 B2 * | 10/2012 | Linetsky ........................ 713/2 |
| 2002/0078367 A1 | 6/2002 | Lang et al. |
| 2002/0112083 A1 | 8/2002 | Joshi et al. |
| 2005/0021996 A1 * | 1/2005 | Howard ........................ 713/200 |
| 2005/0181819 A1 * | 8/2005 | Washio et al. ............. 455/550.1 |
| 2005/0278543 A1 * | 12/2005 | Tsuda et al. ................... 713/182 |
| 2006/0155387 A1 * | 7/2006 | Pieronek ........................ 700/1 |
| 2006/0174334 A1 | 8/2006 | Perlin et al. |

(Continued)

FOREIGN PATENT DOCUMENTS

| EP | 1 764 721 A | 3/2007 |
|---|---|---|
| WO | WO 2009/070430 A2 | 6/2009 |

OTHER PUBLICATIONS

Towards a Software Architecture for DRM|https://lirias.kuleuven.be/bitstream/123456789/134196/1/DRM2005.pdf|Michiels et al.| 2005| pp. 1-10.*

U.S. Appl. No. 11/963,960, filed Dec. 24, 2007.

(Continued)

*Primary Examiner* — Mahfuzur Rahman
(74) *Attorney, Agent, or Firm* — Brinks Hofer Gilson & Lione

(57) ABSTRACT

A set of code for a peripheral device is installed on a host device. The set of code is used to control access to the peripheral device from the host device. The set of code also contains one or more subsets of code that can be used by software entities on the host device for access to the peripheral device. A software entity on a host device must be successfully authenticated with the set of code installed on the host device. Once the software entity is successfully authenticated, the set of code will provide access to the one or more subsets of code specific to the software entity. The one or more subsets of code can be used by the software entity to access the peripheral device.

37 Claims, 14 Drawing Sheets

(56) References Cited

U.S. PATENT DOCUMENTS

2007/0033144 A1* 2/2007 Howard et al. ................ 705/55
2007/0177777 A1* 8/2007 Funahashi et al. ............ 382/124
2007/0294756 A1* 12/2007 Fetik .............................. 726/11
2008/0250129 A1* 10/2008 Carpenter et al. ............ 709/223
2008/0289030 A1* 11/2008 Poplett ........................... 726/15

OTHER PUBLICATIONS

US Patent Appication entitled, "Authentication for Access to Software Development Kit for a Peripheral Device," filed May 21, 2008.
International Search Report and Written Opinion for PCT/US2009/002637, dated Jul. 27, 2009, 11 pages.
Office Action issued in corresponding Chinese Appln. No. 200980127311.1 dated Apr. 6, 2012 (13 pgs).

* cited by examiner

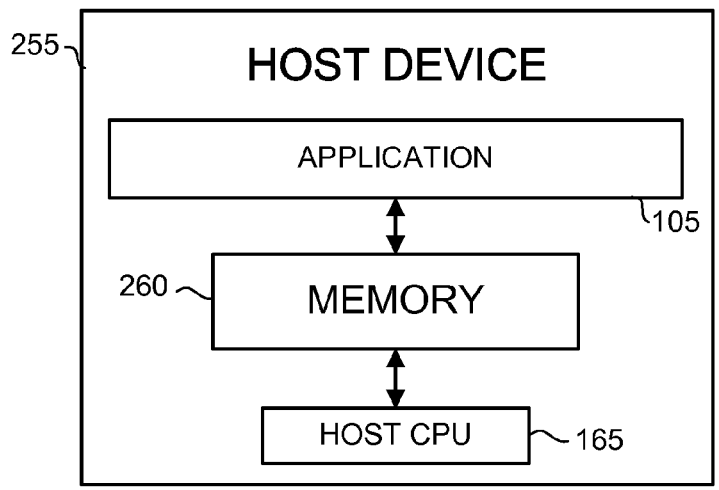
Fig. 1
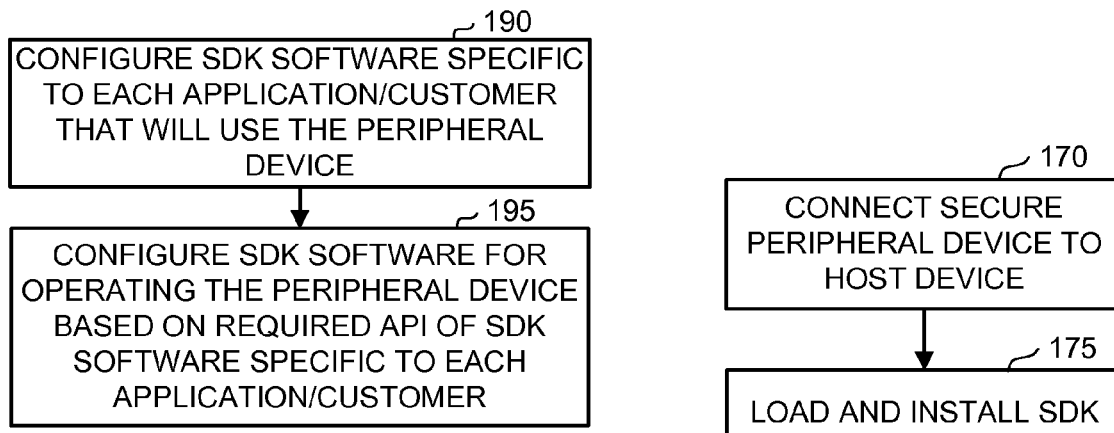
Fig. 2
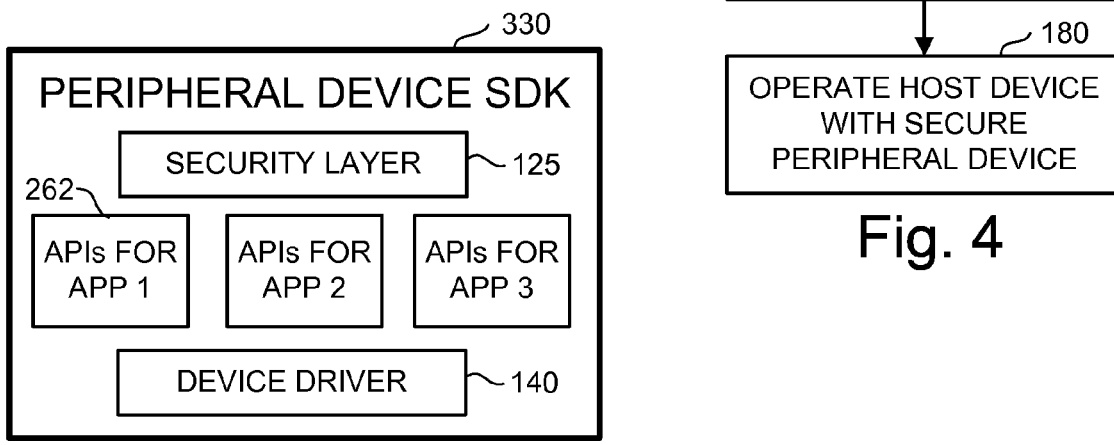
Fig. 3
Fig. 4

SYSTEMS FOR AUTHENTICATION FOR ACCESS TO SOFTWARE DEVELOPMENT KIT FOR A PERIPHERAL DEVICE

CROSS-REFERENCE TO RELATED APPLICATIONS

The following application is cross-referenced and incorporated by reference herein in its entirety: U.S. patent application Ser. No. 12/124,450, entitled "Authentication for Access to Software Development Kit for a Peripheral Device," by Mei Yan, Chieh-Hao Yang, Bahman Qawami, Farshid Sabet-Sharghi, Patricia Dwyer, and Po Yuan, filed the same day as the present application.

BACKGROUND

1. Field

The present invention relates to technology for secure peripheral devices.

2. Description of the Related Art

Preventing unauthorized access to a secure peripheral device has become a greater concern as technology has advanced. An example of a secure peripheral device may be memory devices, as memory devices containing secure content must be protected from unauthorized use.

Semiconductor memory has become more popular for use in various electronic devices. For example, non-volatile semiconductor memory is used in cellular telephones, digital cameras, mobile media players, personal digital assistants, mobile computing devices, non-mobile computing devices and other devices.

Protecting content stored on non-volatile semiconductor memory devices has become an important feature, especially concerning protection for copyrighted material. For example, a user may purchase copyrighted content, such as music, through an electronic device. Content owners typically intend for only the purchaser to use the content and may require that the purchased content be played only by authorized applications on an electronic device, such as the application used to purchase the content.

Securely storing information to protect against unauthorized use of secure content can be performed using a variety of protection techniques, such as encryption. An application on a device that tries to access encrypted content must decrypt the content using an encryption key before that content can be read. An application authorized to access the encrypted content will have the appropriate encryption key for decrypting the content. Unauthorized applications may still be able to access the encrypted content, but without the appropriate encryption key, the unauthorized application may not be able to read the content. However, if an application obtains the encryption key, the unauthorized application will be able to read the protected content. There is a need for an improved, simplified, and secure way of preventing an unauthorized application on an electronic device from accessing protected content on a secure peripheral device.

SUMMARY

The technology described herein pertains to authentication of an application, application launcher, or other software entity on a host device to prevent unauthorized access to a secure peripheral device. The software entity is authenticated with set of code on the host device using any authentication mechanism. The set of code is associated with the peripheral device and is installed on the host device to control access to the peripheral device. The set of code also contains code that software entities on the host device can use for performing tasks associated with the peripheral device. Once the software entity is successfully authenticated, the set of code will make code that the software entity can use for performing tasks associated with the peripheral device available to the software entity.

One embodiment includes a secure peripheral device and a host device in communication with the peripheral device. The host device includes one or more processors that control access to the peripheral device. The one or more processors also manage a set of code installed on the host device for the peripheral device by controlling access to the set of code, where the set of code allows communication between the peripheral device and one or more software entities on the host device. The one or more processors verify a credential from a first software entity on the host device and expose a subset of code from the set of code to the first software entity if the credential is valid, where the subset of code is associated with the first software entity.

One embodiment includes a cryptographic engine and one or more processors on a host device that are in communication with the cryptographic engine. The cryptographic engine verifies a credential from a first software entity on the host device. The one or more processors intercept access to a secure peripheral device. The one or more processors also receive the credential from the first software entity and expose code associated with the first software entity if the credential is valid. When the one or more processors execute the code, the one or more processors allow the first software entity to access the peripheral device.

One embodiment includes one or more processor readable media having processor readable code respectively, where the processor readable code causes the one or more processors to perform a method. The method includes sending one or more authentication options to a first software entity on a host device when the first software entity requests access to a peripheral device including sending one or more authentication options to the first software entity from a set of code installed on the host device for the peripheral device, where the set of code includes code associated with one or more software entities on the host device. The set of code receives a credential from the first software. The credential is associated with one of the one or more authentication options. The method further includes providing access to first code associated with the first software entity if the credential is valid. The first code allows access to the peripheral device and is part of the set of code.

BRIEF DESCRIPTION OF THE DRAWINGS

FIG. 1 is a block diagram of a host device before a SDK for a secure peripheral device is installed.

FIG. 2 is a flow chart describing one process for configuring a SDK associated with a secure peripheral device.

FIG. 3 depicts one example of a secure peripheral device SDK.

FIG. 4 is a flow chart describing one process for loading a secure peripheral device into a host device.

DETAILED DESCRIPTION

Figure 5:
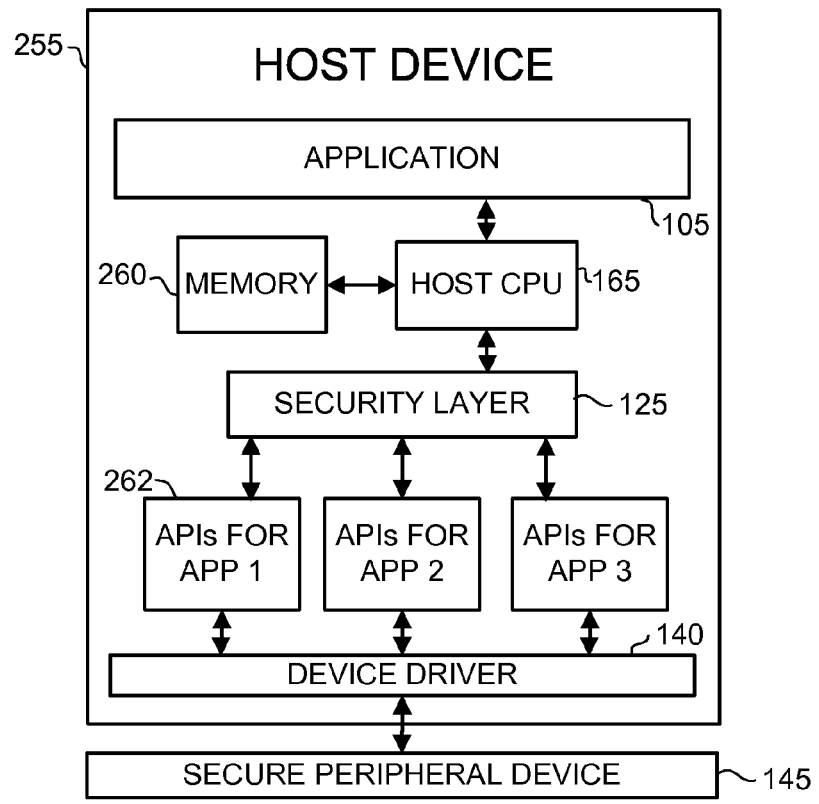
FIG. 5 is a block diagram depicting one embodiment of a host device after a SDK for a secure peripheral device is installed.

The disclosed technology provides secure access to a peripheral device by implementing security features on a host device. A peripheral device can be any device operated via a host device, such as a memory device, a printer, a keyboard, etc. Software for the peripheral device must be installed on the host device in order to operate the peripheral device on the host device. This software is a set of code for a software development kit (SDK), such as a dynamic link library (DLL) or a static library (LIB), installed on the host device for operating the peripheral device via one or more software entities or applications on the host device. Many times, different applications on the host device will require different APIs for accessing the peripheral device depending on the type of application, the functions of the application, and the authority of the application, for example. When a user sends a task request to the host device via an application and the task request involves access to the peripheral device, the SDK for the peripheral device will authenticate the application and verify that the application is authorized to access the peripheral device. If the authentication is successful, the SDK will expose only those APIs for that specific application. The SDK will not expose APIs the application is not authorized to access. The application can send and perform the task request using the exposed APIs specific to that application. This increases the security of the peripheral device and prevents unauthorized access to APIs for other applications.

FIG. 1 depicts one example of a host device 255 before the set of code for an SDK for a peripheral device is installed. The host device 255 has an application 105, memory 260, and a host CPU 165. The host device 100 can be any electronic device, such as a cellular telephone, a PC, a digital camera, mobile media players, personal digital assistant, mobile computing device, non-mobile computing device and other devices. The application 105 can be any software entity used on a host device, such as a calendar, document viewer, media player, etc. The application 105 can also be any software entity used to launch an application. The memory 260 can be any type of memory that a host device 255 may require. The host CPU 165 can be any type of processor used for operating the host device 255.

When a SDK is created by a software developer for a peripheral device that will be operated through a host device, such as the host device 255 depicted in FIG. 1, the SDK software may be configured for each software entity or application on the host device that will require access to the peripheral device. Many times, the software entity on the host device may be owned or created by a particular customer with various needs and preferences. The SDK may be configured based on each software entity/application or customer's needs and preferences, such as authorization preferences or functions of the customer's application. FIG. 2 is a flow chart for one process of configuring a set of code for a SDK based on different application and/or customer needs and preferences. In step 190, the SDK software specific to each application and/or customer will be configured by the SDK software developer based on the specific requirements of the application and/or customer. For example, the set of code for the SDK for accessing a peripheral device through a customer application typically requires an API for interfacing the application with the peripheral device. The SDK software for access to these APIs for the application can be specifically configured based on customer preferences, such as configuring the SDK to require application authentication before the peripheral device is accessed, for example. The SDK is configured to determine which APIs each application will need to access. In step 195, the SDK software for operating the peripheral device will be configured based on the required APIs of the SDK software specific to each application/customer performed in step 190. This may include, for example, any SDK software modification needed for any security features required of each application/customer. Once the SDK software for operating the peripheral device is configured, the SDK will properly function using all of the software configured for each application and/or customer in step 190 (e.g. security software required for authentication) and any other software needed to operate the peripheral device on the host device, including the software customized in step 195.

FIG. 3 depicts one example of a set of code for a peripheral device SDK 330 that has been configured according to the process described in FIG. 2. The peripheral device SDK 330 includes subsets of code such as the security layer 125, APIs for applications 1-3, and a device driver 140. The sets of code for the SDK can be a dynamic link library (DLL) or a static library (LIB). The security layer 125 includes the software for authenticating different applications that attempt to access the peripheral device. The security layer 125 may be part of the SDK software that is configured as described in step 195 of FIG. 2. For example, the security layer 125 can be configured if the APIs for Application 1 262 require extra authentication features. The security layer 125 will be later discussed in more detail. The APIs for applications 1-3 are the APIs that each application must use to communicate with the peripheral device. These APIs may be configured based on customer preferences for each application, as described in step 190 of FIG. 2. For example, APIs for Application 1 262 may be the APIs customized for application 105 in the host device 255 of FIG. 1. The device driver 140 is the software that allows the peripheral device to properly operate on the host device.

FIG. 4 is a flow chart describing one process for installing the SDK shown in FIG. 3 on a host device. In step 170 of FIG. 4, the secure peripheral device is connected to the host device. When the secure peripheral device is connected to the host device, the SDK for operating the secure peripheral device is loaded and installed onto the host device (step 175). This SDK may be stored in memory for the secure peripheral device. The SDK contains software used to program the host CPU on the host device in order to operate the secure peripheral device so that unauthorized access is prevented. Once the set of SDK code is properly loaded and installed onto the host device, the host device can be operated with the secure peripheral device (step 180).

Note that in some embodiments, step 175 is performed for a particular secure peripheral device only during the first time that the particular secure peripheral device is connected to the host device. Once the SDK is installed on the host device during the first connection of a secure peripheral device, the SDK for this particular peripheral device need not be installed again each time it is re-connected to the host device. In other embodiments, the SDK is loaded and installed every time the secure peripheral device is connected to the host device.

In one embodiment, the SDK for operating the secure peripheral device is loaded and pre-installed on the host device before the operating system is installed on the host device. In this case, the SDK can be used by activating or selecting it through the operating system. Therefore, step 175 need not be performed as part of the process of FIG. 4. In another embodiment, the SDK for operating the secure peripheral device is loaded and pre-installed on the host device after the operating system for the host device has been installed. Again, in this case, step 175 need not be performed as part of the process of FIG. 4.

FIG. 5 shows one embodiment of the host device 255 with the secure peripheral device 145 after the set of code for the SDK 330 of FIG. 3 has been installed. The host device 255 includes the original components shown in FIG. 1 (application 105, memory 260, and host CPU 165) as well as the components of the SDK 330 shown in FIG. 3 (security layer 125, APIs for applications 1-3, and device driver 140). When a user of the host device 255 requests a task involving the secure peripheral device 145 via the application 105, the security layer 125 will cause the host CPU 165 to authenticate the application 105. If the application 105 is successfully authenticated with the security layer 125, the security layer will expose the subgroup of APIs specific to the application 105, such as APIs for Application 1 262, if application 105 was Application 1. The application 105 can then use that subset of the set of SDK code to send the task request to the secure peripheral device 145 via the device driver 140. The application 105 can also use those APIs to perform the task request for the user.

To more specifically describe the process of securely accessing a peripheral device through a SDK for the peripheral device, a secure memory device will be used as an example of a peripheral device. However, note that the peripheral device can be any peripheral device and is not limited to the example of a memory device described below.

Figure 6:
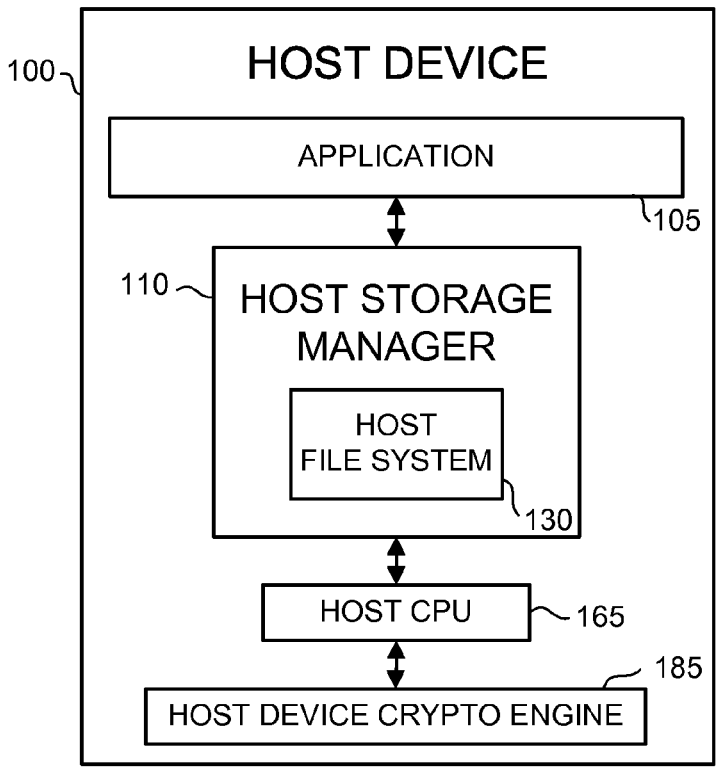
FIG. 6 is a block diagram depicting one embodiment of host device components before installing code for a secure memory device.

FIG. 6 shows one embodiment of the components in a host device 100 before a SDK for a secure memory device is installed. Typically, a user of a host device 100 assesses content stored on the host device 100 through a software entity such as an application 105. Examples of applications on the host device 100 include media players, calendars, address books, etc. that are saved on the host device 100. An application can also be executable code on the host device used to launch an application (i.e. media players, calendars, address books, etc.) stored in a different location from the executable code on the host device 100. For example, an application may be used to launch a media player application that is saved within the host device in a different part of memory for the host device 100 or on a peripheral device connected to the host device 100. Content accessed or saved using an application 105 can include content such as applications, media, scheduling information, or contact information, etc.

The application 105 uses a host storage manager 110 on the operating system for the host device 100 to access or store content on the host device 100 or any other peripheral devices, such as a removable memory device. The host storage manager 110 is a software component on the operating system that controls access and storage functions for the host device 100, including access and storage within the host device 100 and between any peripheral devices, as will be explained in more detail below.

FIG. 6 also shows the host storage manager 110 and the host file system 130, which is a component that the host storage manager 110 manages. The host storage manager 110 uses the host CPU 165 to access the host file system 130. The host file system 130 is stored in memory on the host device 100 and is used to locate and store content stored on the host device 100 and in any peripheral devices. When a user requests content from the host device 100, the host storage manager 110 will use the host file system 130 to locate the content. When a user requests that content be stored, the host storage manager 110 will use the host file system 130 to store the content in the proper location.

Additionally, content stored on the host device 100 can be encrypted for protection. The host device may contain a host cryptographic engine 185, which may have a random number generator and a cryptographic processor that may support encryption methods such as symmetric encryption (i.e. AES, DES, 3DES, etc.), cryptographic hash functions (i.e. SHA-1, etc.), asymmetric encryption (PKI, key pair generation, etc.), or any other cryptography methods.

Figure 7:
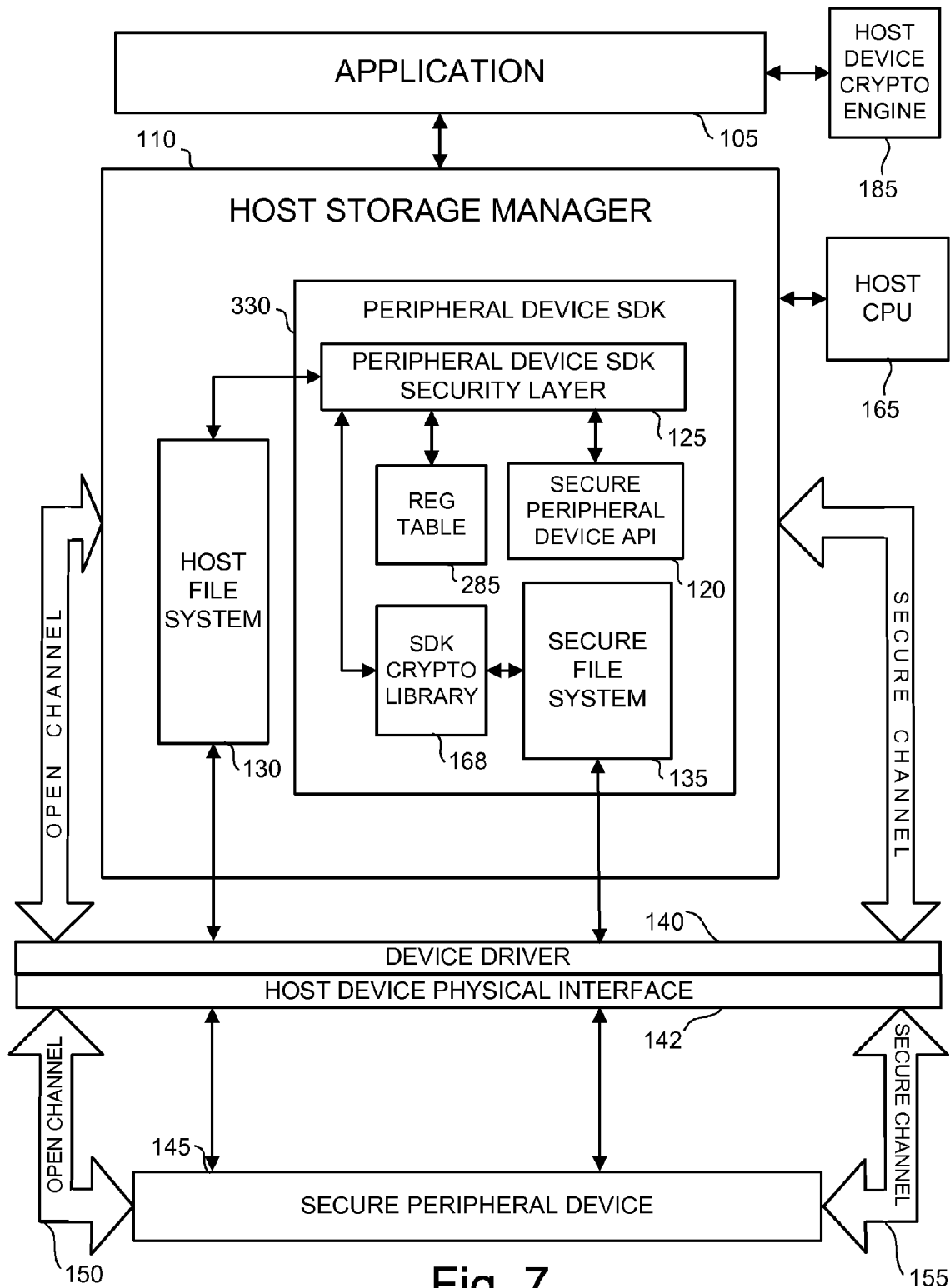
FIG. 7 is a block diagram depicting one embodiment of components of a host device and a secure memory device.

FIG. 7 shows one example of the host device 100 that operates with a secure memory device 145 after the set of code for the peripheral device SDK 330 has been properly loaded and installed on the host device 100. In one embodiment, the secure peripheral device is a removable storage device for storing content that either may be stored in a secure partition of the secure memory device or may be stored in a public partition of the secure memory device. The secure memory device can be any type of memory device, such as a mass storage device, a non-volatile flash memory device, etc. The secure memory device protects against unauthorized access of content stored in the secure partition of the secure memory device. The secure memory device may also protect against unauthorized access of content stored in the public partition of the secure memory device if the content is protected. Content is protected in the secure memory device if the content is encrypted. Content is unprotected in the secure memory device if the content is unencrypted and is stored in a public partition. A host device may access and store content on the secure memory device if the host device has the proper authorizations associated with the content, such as authorizations that allow the content to be encrypted or decrypted.

In FIG. 7, the host device 100 is physically connected to the secure memory device 145 through the physical interface 142. The application 105, the host CPU 165, the host device crypto engine 185, the host storage manager 110, and the host file system 130 are software components on the host device 100 as shown in FIG. 6. The peripheral device SDK 330 is the set of code installed on the host device 100 and is used to operate the secure peripheral device 145 with the host device 100. The peripheral device SDK 330 uses the secure peripheral device API 120, the peripheral device SDK security layer 125, the host file system 130, the registration table 285, the SDK crypto library 168, and the secure file system 135 to manage content access and storage for the secure memory device 145. The secure peripheral device API 120, the peripheral device SDK security layer 125, the registration table 285, the SDK crypto library 168, the secure file system 135, and the device driver 140 are software components loaded and installed on the host device from the set of code for SDK for the secure memory device 145 as described in step 175 of FIG. 4. The open channel 150 and the secure channel 155 are the data buses used to transfer content between the host device 100 and the secure memory device 145.

The secure memory device 145 controls access to and storage of content using software installed on the host device 100 for the secure memory device 145. The software includes the libraries described in step 175 of FIG. 2 or they can be libraries pre-installed on the host device. The SDK libraries loaded and installed on the host device can be either dynamic link libraries (DLL) or static libraries (LIB) that can be integrated into the operating system on the host device. The set of code for the SDK provide hooks into the host storage manager 110 for secure operation of the secure memory device 145. For example, subsets of code from the set of code for the peripheral device SDK can be inserted in the call chain for calling the host file system 130 so that the code causes the host CPU 165 to control how content is accessed and stored. In FIG. 7, the peripheral device SDK security layer 125, the secure peripheral device API 120, the secure file system 135, the registration table 285, the SDK crypto library 168, and the device driver 140 are the subsets of code that are provided to the host device through the set of code for the secure peripheral device SDK using a device driver 140 installed on the host device 100.

A user may access content stored in the secure memory device 145 through a software entity, such as an application 105 on a host device, as shown in FIG. 7. For protected content stored in the secure peripheral device 145, the application 105 first needs to be authenticated before the content can be accessed, as described in more detail below.

The application 105 uses the host storage manager 110 on the operating system for the host device to access or store content in the secure memory device 145. The host storage manager 110 controls access and storage functions for the host device, including access and storage within the host device and the secure memory device 145.

Typically, the host storage manager 110 controls access and storage functions for the host device or any peripheral devices using a host file system 130 on the operating system for the host device, as discussed in FIG. 6. The host file system 130 can be any standard file system, such as FAT12, FAT16, FAT32, NTFS, etc. However, for the secure memory device 145, the peripheral device SDK 330 for the secure memory device 145 uses a peripheral device SDK security layer 125 to control access and storage functions on the host device by using a secure file system 135 for the secure memory device 145. Access to the secure file system 135 is controlled by authenticating the application 105 and allowing access to only APIs specific to the application 105 upon successful authentication. These APIs allow the proper interface for the secure file system 135. The secure file system 135 is installed on the host device 100 for the secure memory device 145 and is the file system for the content stored in the secure memory device 145. The secure file system 135 can be any standard file system, such as FAT12, FAT16, FAT32, NTFS, etc.

Software for the peripheral device SDK security layer 125 is loaded and installed as part of the SDK loaded and installed in step 175 of FIG. 2. The peripheral device SDK security layer 125 causes the host CPU 165 to authenticate the application 105. After the application 105 is successfully authenticated, the application 105 will be registered in the registration table 285. The peripheral device SDK security layer 125 also provides an application handler to the application 105. The application handler indicates which APIs the application 105 is allowed to access. More detail regarding the authentication and registration process performed by the peripheral device SDK security layer 125 will be described below.

When a user, through an application 105, requests access to content, the peripheral device SDK security layer 125 will provide the appropriate API, such as secure peripheral device API 120, needed to access the content from the secure peripheral device 145 after successful authentication. Using the accessed API, the application 105 can receive the content stored in the secure peripheral device 145 by accessing the permissions associated with the content. For protected content, the header is stored with the content and contains information associated with the content, such as domain information related to content encryption keys (CEK) for encrypting and decrypting the content, and content metadata, which may indicate what type of content is stored.

The secure peripheral device API (Application Program Interface) 120 in the peripheral device SDK 330 is used to interface the secure peripheral device 145 with the application 105 when content is accessed or stored. The secure peripheral device API 120 is part of the SDK that is installed and may be called by the application 105 when the application 105 is successfully authenticated. The secure peripheral device API 120 is the interface bridge between the peripheral device SDK security layer 125 and the secure file system 135.

Once the content is located or filed using either the secure file system 135, the content can be accessed or stored on the secure memory device 145 in the appropriate location using the device driver 140 on the host device. This is performed through the physical interface 142 that physically connects the host device 100 and the secure memory device 145. The content may be accessed or stored using a secure channel 155 or an open channel 150. The peripheral device SDK 330 determines whether the content should be transferred between the secure peripheral device 145 and the host device using a secure channel 155 or an open channel 150.

When a user, through the application 105, requests storage of content that should be unprotected, the peripheral device SDK 330 will use the host file system 130 to store the content. If the user requests storage of content that should be protected in the secure peripheral device 145, the peripheral device SDK 330 will use the secure file system 135 to store the content.

The secure peripheral device API (Application Program Interface) 120 in the peripheral device SDK 330 is used to interface the secure peripheral device 145 with the application 105 when protected content is accessed or stored. The secure peripheral device API 120 is part of the SDK that is installed and may be called by the application 105 when the application 105 is successfully authenticated. The secure peripheral device API 120 is the interface bridge between the peripheral device SDK security layer 125 and the secure file system 135.

Once the content is located or filed using either the host file system 130 or secure file system 135, the content can be accessed or stored on the secure peripheral device 145 in the appropriate location using the device driver 140 on the host device. This is performed through the physical interface 142 that physically connects the host device 100 and the secure memory device 145. The content may be accessed or stored using a secure channel 155 or an open channel 150. The peripheral device SDK security layer 125 determines whether the content should be transferred between the secure peripheral device 145 and the host device using a secure channel 155 or an open channel 150.

A session key is an encryption key used to encrypt content before it is transferred between the host device and the secure memory device. If content does not need to be transferred through a secure channel, there may be no session key associated with the content, or the session key associated with that content may indicate that no encryption is needed.

If the content is associated with a session key indicating that the content should be transferred using a secure channel 155, the content will be encrypted using the session key before it is transferred through the secure channel 155. Once the encrypted content is transferred, the content will be decrypted using the same session key. The content is encrypted or decrypted on the host device 100 using the SDK crypto library 168. The SDK crypto library 168 contains a random number generator and cryptographic functions for encryption, such as symmetric encryption (i.e. AES, DES, 3DES, etc.), cryptographic hash functions (i.e. SHA-1, etc.), asymmetric encryption (PKI, key pair generation, etc.), or any other cryptography methods. The secure peripheral device 145 has its own crypto engine for encryption on the secure memory device 145 before or after transferring content, as will be explain in more detail for FIG. 11. If the session key indicates that the content should be transferred using an open channel 150, the content is transferred without encrypting the content.

For host devices that do not have the peripheral device SDK installed, the host device may be able to access content stored in a public partition. If the content is protected, although the device may be able to access the content, the device will not be able to read the content correctly if it is encrypted. If the content is stored in a secure partition, the device cannot access the content.

Figure 8:
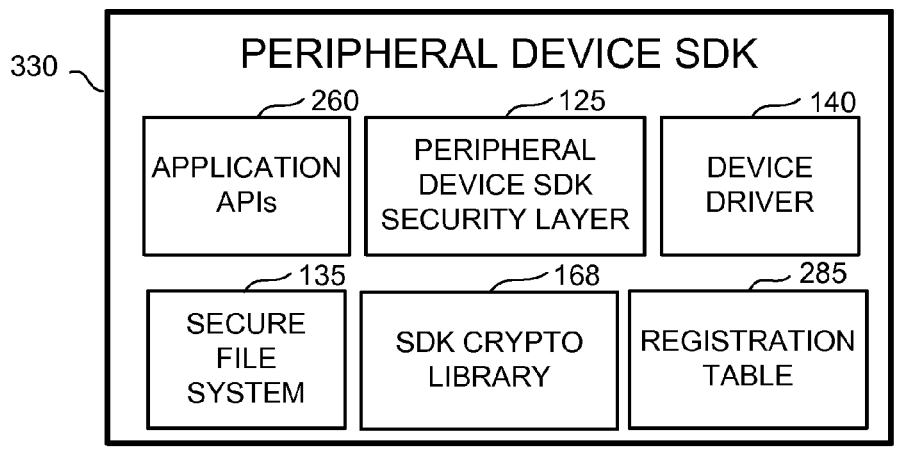
FIG. 8 is a block diagram of one embodiment for a memory device SDK.

FIG. 8 shows an example of software contained in the peripheral device SDK 330 that is installed on the host device 100 when the peripheral device is a secure memory device, as shown in FIG. 7. Again, the peripheral device is not limited to the example for a memory device. The peripheral device SDK 330 is the library that is installed on the host device 100 and contains software for operating the secure memory device 145 on the host device 100, such as peripheral device APIs 260, the peripheral device SDK security layer 125, the device driver 140, the secure file system 135, the SDK crypto library 168, and the registration table 285. However, the peripheral device SDK 330 is not limited to only this software.

The application APIs 260 are the APIs used by any application, such as the application 105 in FIG. 7. These APIs include APIs used for authentication, and they also include APIs used to interface an application with the secure file system 135 for access to content on the secure memory device 145 once the application has been successfully authenticated, such as the secure peripheral device API 120 in FIG. 7. The application APIs 260 may contain APIs specific to that particular application. For example, an API used by one application may not be used by another application. An application that is successfully authenticated through the peripheral device SDK security layer 125 may access protected content in the secure memory device 145 through a secure peripheral device API 120. The secure peripheral device APIs 120 are discussed in more detail below for FIG. 12.

The peripheral device SDK security layer 125, as shown in FIG. 7, is installed on the host device to provide hooks into the host storage manager 110 and cause the host CPU 165 to control how content on the secure memory device 145 is accessed and stored. The code for the peripheral device SDK security layer 125 'hijacks' the host file operations on the host device 100 so that an application can be authenticated before accessing content on the secure peripheral device 145.

The software of the device driver 140, as shown in FIG. 7, can be loaded and installed on the host device after the secure memory device 145 is connected to the host device 100 (step 175 of FIG. 4) or pre-installed on the operating system for the host device 100 either before or after the operating system is installed on the host device.

The secure file system 135 is the file system containing filing data for accessing and storing content in the secure memory device 145, as illustrated in FIG. 7.

The SDK crypto library 168 is the library containing the cryptographic schemes that may be used for encrypting or decrypting content for a secure channel 155. The cryptographic schemes can be any known schemes, such as AES, DES, 3DES, SHA-1, PKI, key pair generation, etc. The SDK crypto library 168 will encrypt or decrypt content based on permissions associated with the content, such as a session key.

The registration table 285 is the table used by the peripheral device SDK security layer 125 to manage and maintain the application authentication status and related information. The table may contain information such as authentication algorithms, application ID, registration time, expiration time, registration status, etc. More detail regarding the registration table 285 will be discussed below.

Figure 9:
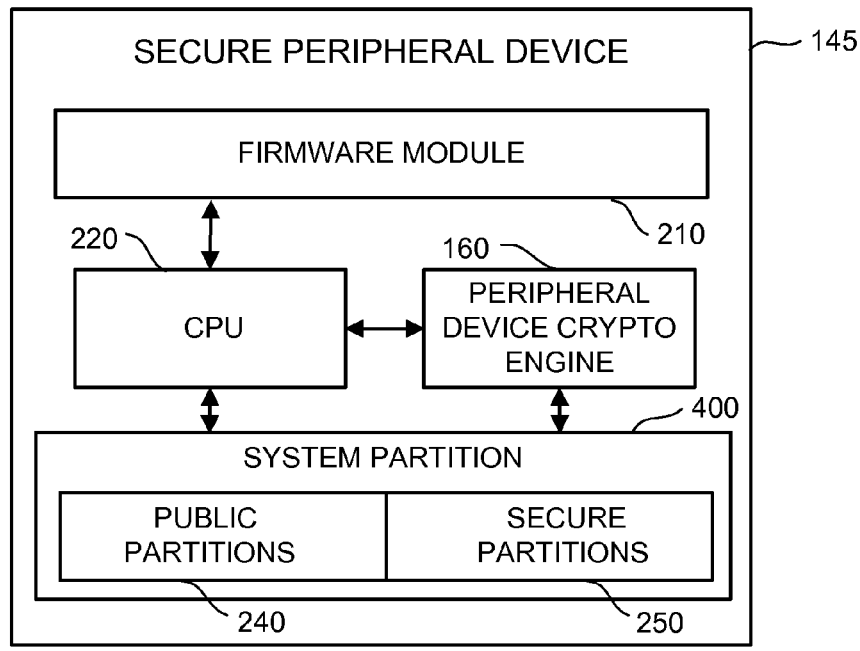
FIG. 9 is a block diagram depicting one embodiment of a secure memory device.

Continuing with the example of a secure memory device, FIG. 9 depicts one embodiment of the secure peripheral device 145 shown in FIG. 7. The secure peripheral or memory device 145 contains a firmware module 210, a CPU 220, a peripheral device crypto engine 160, and a system partition 400. The system partition 400 contains public partitions 240 and secure partitions 250. The firmware module 210 accesses and stores content in either the public partitions 240 or the secure partitions 250 of the system partition 400 using the CPU 220. The memory device crypto engine 160 is used to encrypt or decrypt the accessed or stored protected content within the secure memory device 145.

The firmware module 210 contains the hardware and software for controlling the access and storage of content on the secure memory device 145 for the secure partitions 250 and the public partitions 240. The firmware module programs the CPU 220 to perform the access and storage functions, such as determining from which portion of memory content should be accessed or stored and whether the content is protected. More details regarding the firmware module 210 will be discussed below in the description for FIG. 10.

The public partitions 240 are memory partitions of the secure memory device 145 that are viewable by a user and detectable by the host device 100. The secure memory device 145 may have one or more public partitions. The public partitions 240 may contain public content that is openly accessible to a user or the host device 100. The public partitions 240 may also store protected content that is encrypted using a content encryption key (CEK). The CEK can be generated using the domain information stored in the content header containing information associated with the content. Public content may also be stored without encrypting the content.

The secure partitions 250 are hidden memory partitions of the secure memory device 145 that are not viewable by a user and are not detectable by the host device. The secure memory device 145 may have one or more secure partitions. The secure partitions 250 may contain protected content that is not openly accessible to the user or the host device 100. The protected content may be encrypted using a CEK. Content stored in the secure partitions 250 is accessible to authenticated applications having the appropriate permissions for accessing the content. The information associated with the CEK and the permissions associated with the content are stored in the content header containing information associated with the content. In one embodiment, public partitions 240 and secure partitions 250 of the system partition 400 are stored in a flash memory device that includes a controller and one or more flash memory arrays.

Because the secure partitions 250 are hidden partitions undetectable by a user or the host device, the secure partitions 250 may contain the software for operating the secure memory device 145 on the host device 100, including rights objects, application credentials, etc.

The peripheral device crypto engine 160 is used to encrypt or decrypt the content using the CEK or the session key within the secure memory device 145. The memory device crypto engine 160 contains a random number generator and a cryptographic processor that may support encryption methods such as symmetric encryption (i.e. AES, DES, 3DES, etc.), cryptographic hash functions (i.e. SHA-1, etc.), asymmetric encryption (PKI, key pair generation, etc.), or any other cryptography methods.

Figure 10:
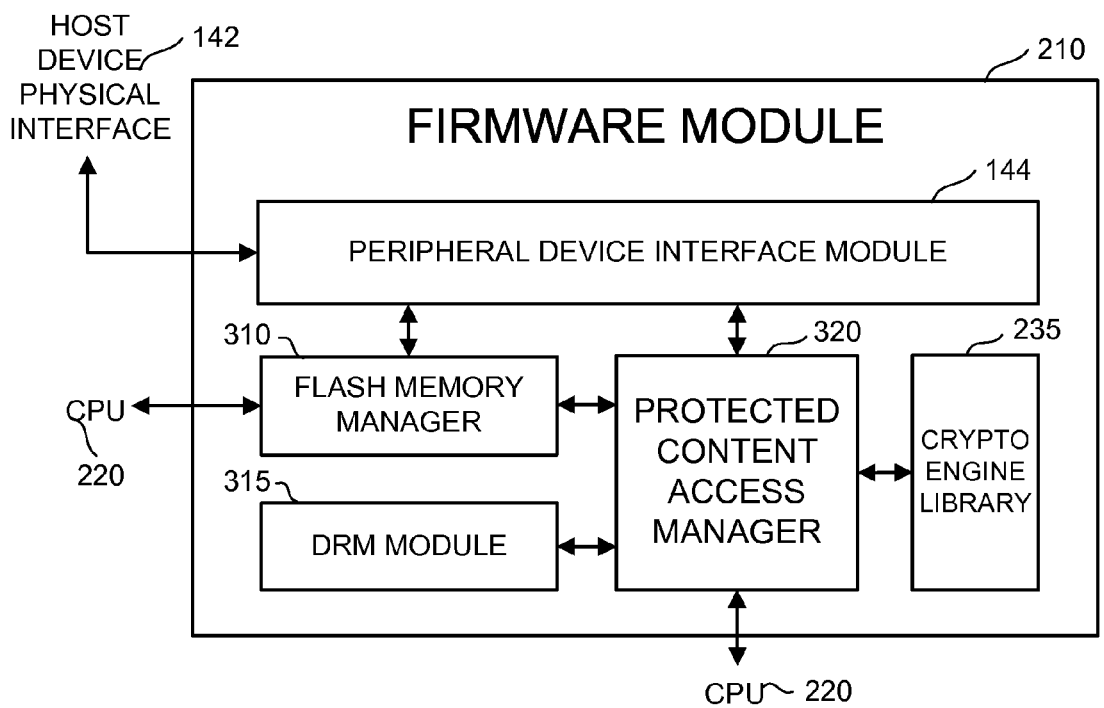
FIG. 10 is a block diagram depicting one embodiment of a firmware module for a secure memory device.

FIG. 10 depicts the details of one embodiment for the firmware module 210. The firmware module 210 contains a peripheral device interface module 144, a flash memory manager 310, a protected content access manager 320, a crypto engine library 235, and a DRM (digital rights management) module 315. The peripheral device interface module 144 contains the hardware and software for interfacing the secure memory device 145 with the host device 100 via the host device physical interface 142. The hardware components for the peripheral device interface module 144 can include components for any type of interface, such as a Universal Serial Bus (USB), Secure Digital (SD), or Compact Flash (CF) interface. The flash memory manager 310 contains the software that causes the CPU 220 to access or store unprotected content in the public partitions 240 and may cause the CPU 220 to access or store the content based on permissions using the DRM module 315. The protected content access manager 320 contains the software that causes the CPU 220 to access or store protected content using permissions for the protected content and may cause the CPU 220 to access or store the protected content based on the permissions using the DRM module 315. The protected content access manager 320 may also use the crypto engine library 235, which stores the information needed to encrypt content using a session key or a CEK. Both the flash memory manager 310 and the protected content access manager 320 access and store content for the host device through the device driver 140 on the host device.

If no protection is needed, the flash memory manager 310 controls access and storage of unprotected content in the secure memory device 145 using the CPU 220. When a request to save unprotected content is received from the host device 100 through the device driver 140, the flash memory manager 310 will save the content in the appropriate location according to the host file system 130. When a request to access unprotected content is received through the host device file system 130 via the device driver 140, the flash memory manager 310 will access the content from the appropriate location using the host file system 130. The flash memory manager 310 also provides access to the protected content access manager 320 when the application 105 tries to access protected content in the secure memory device 145.

If protection is needed, the protected content access manager 320 controls access and storage of protected content in the secure memory device 145 using the CPU 220. The protected content access manager 320 stores or retrieves the permissions associated with the protected content to or from the DRM module 315. The protected content access manager 320 uses the secure file system 135 shown in FIG. 7 to access or store protected. For example, when a request to save protected content is received from the host device through the device driver 140, the peripheral device SDK security layer 125 will use the SDK crypto library 168 to encrypt the protected content using a session key associated with the content if the content should be sent through a secure channel 155. The encrypted content is then sent to the secure memory device 145 through the secure channel 155 and decrypted at the secure memory device 145 using the session key and the appropriate cryptographic scheme from the crypto engine library 235. The decrypted content is then encrypted by the peripheral device crypto engine 160 using a CEK for the content. The content encrypted using the CEK is then saved in the appropriate location according to the secure file system 135.

For protected content sent through an open channel, a similar method for transferring the content is performed but without the session key encryption for the secure channel 155. When a request to access protected content is received from the host device 100 through the device driver 140, the protected content access manager 320 will access the content from the appropriate location using the secure file system 135 and provide the content to the host storage manager 110 on the host device 100 through an open channel 150. The protected content access manager 320 will access and store content through the flash memory manager 310 once the appropriate permissions are determined by the protected content access manager 320.

The protected content access manager 320 may also use the DRM module 315 to provide access to content based on permissions associated with the content, such as copyright permissions for example. The DRM module 315 can support any particular DRM technology, such as OMA DRM, MS DRM, etc.

The crypto engine library 235 contains the cryptographic schemes that may be used for encrypting the content with a CEK or a session key within the secure memory device 145. When content should be encrypted or decrypted in the secure memory device 145, the protected content access manager 320 will access the appropriate cryptographic scheme from the crypto engine library 235. The cryptographic schemes can be any of the known schemes, such as AES, DES, 3DES, SHA-1, PKI, key pair generation, etc.

Figure 11:
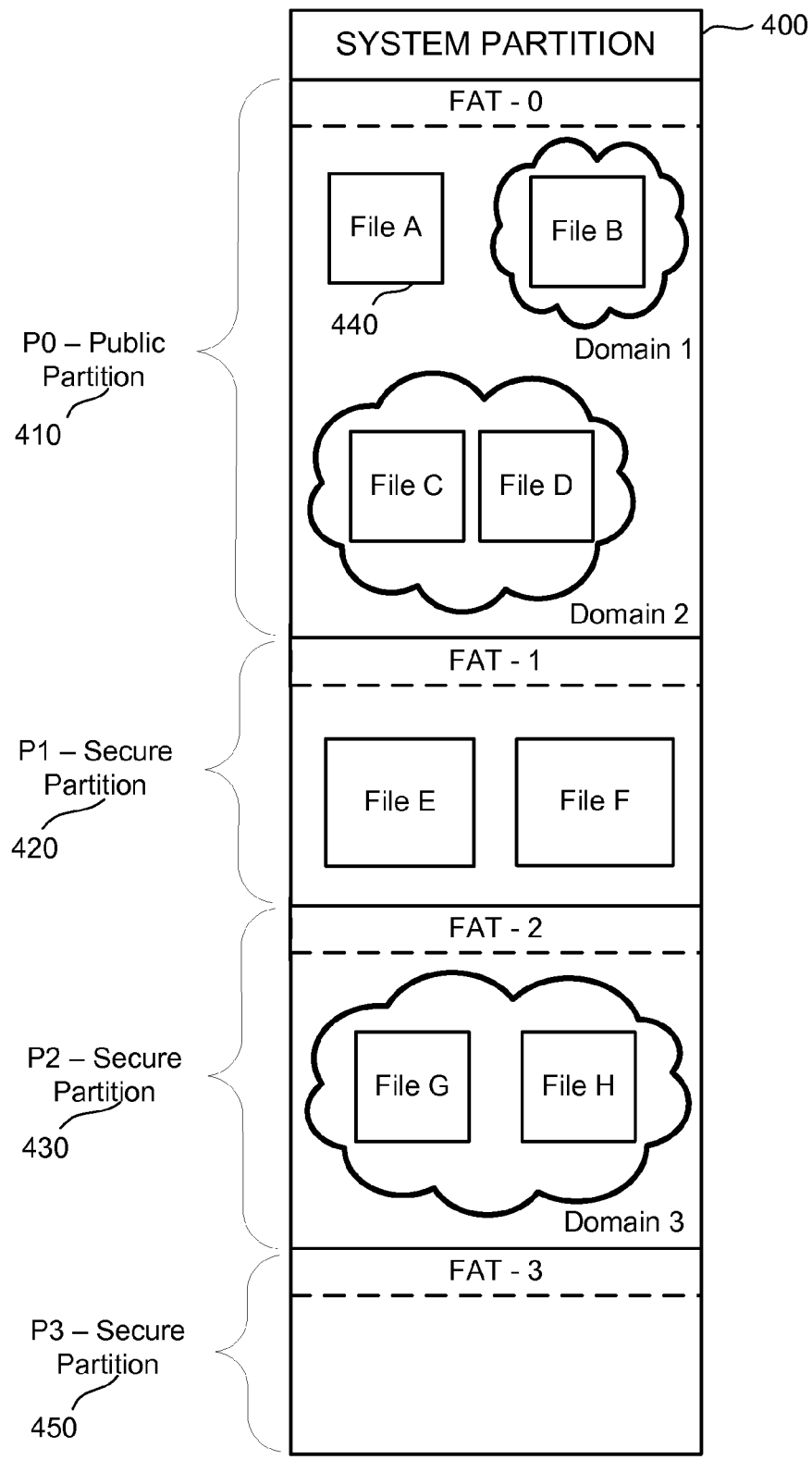
FIG. 11 depicts one example of partitions within a secure memory device.

FIG. 11 depicts an example of a system partition 400 for the secure memory device 145. The system partition 400 includes all of the memory partitions in the secure memory device 145. That is, the system partition 400 is made up of the public partitions 240 and the secure partitions 250 shown in FIG. 9. The secure memory device 145 may have any number of public or secure partitions. As previously described, a public partition is detectible and openly accessible to a user or a host device. Unprotected content stored in a public partition can be accessed without authentication. However, protected content stored in a public partition must be accessed only after successful authentication. A secure partition is a hidden partition that is undetectable to a user or a host device. Any application attempting to open content in a secure partition must first be authenticated.

When protected content is saved to the secure memory device 145, the protected content access manager 320 organizes the content according to the permissions associated with the content and the content is then stored by the flash memory manager 310. Public and secure partitions may have domains or logic groups that contain groups of protected content having the same CEK. Each domain or logic group is associated with one CEK for decrypting content from or encrypting content to that domain or group. Any application having the appropriate permissions for opening content within a domain or group may also be able to open other content stored in the same domain or group.

Public partition P0 410 in FIG. 11 contains two logic groups, Domain 1 and Domain 2. All content stored in Domain 1 will use one CEK for encrypting and decrypting content. All content stored in Domain 2 will use another CEK for encrypting and decrypting the content. A software entity attempting to access either of these groups will require authentication before the content can be read. Because the public partition P0 is not hidden and is openly accessible, protected content contained within a group may be seen and possibly accessed but the content may not be read unless the content is properly decrypted using the appropriate CEK. Therefore, it is possible that content in a group may be corrupted by an unauthorized user but the content may not be read.

File A 440 in public partition P0 410 is not contained within a group so it does not have a CEK associated with it. Therefore, any user may access and read File A 440.

Secure partition P1 420 contains File E and File F. File E and File F can be any file requiring protection in a secure partition. For example, File E or File F can be used by the SDK to store secure information, such as content licenses or any internal management data. However, secure partition P1 420 is not limited to storing only these types of files. Secure partition P1 420 can store any secure files.

Secure partition P2 430 contains File G and File H, both within Domain 3 490. Domain 3 is associated with a CEK for encrypting and decrypting the content. For example, if an application attempts to access File G in Domain 3, the application must first be authenticated. Once authenticated, the application may access File G using the CEK for Domain 3 and may also access File H within Domain 3.

Secure partition P3 450 shows an empty partition that may be used to store any protected content.

Figure 12:
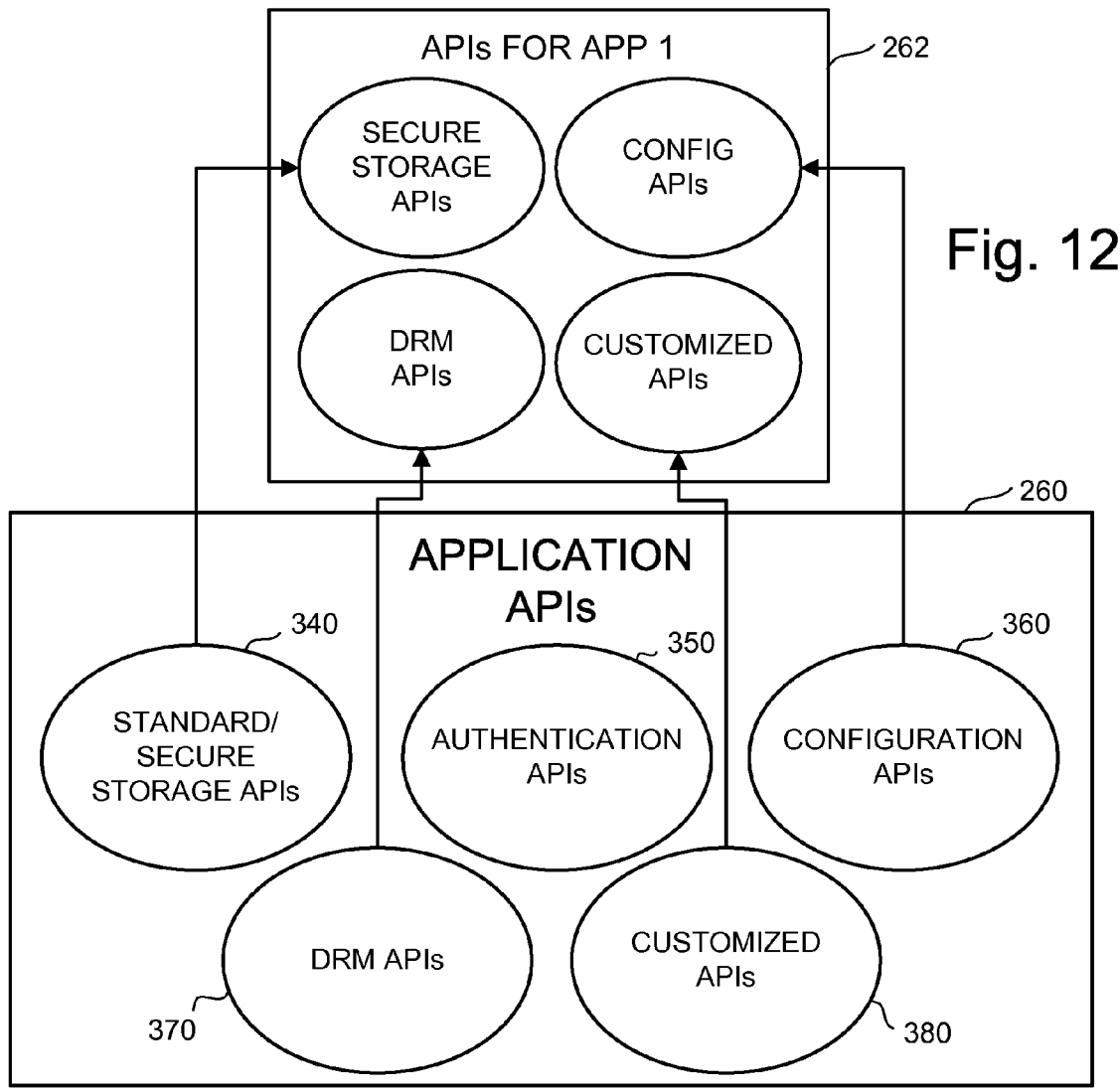
FIG. 12 is one example of application APIs contained in a SDK for a memory device.

FIG. 12 shows an example of the application APIs 260 contained in the peripheral device SDK 330. The application APIs 260 include standard and secure storage APIs 340, authentication APIs 350, configuration APIs 360, DRM APIs 370, and any other customized APIs 380 that a user may need for operating the secure memory device 145 on the host device 100. Each of the different types of APIs may be specific to a software entity, such as an application or an application launcher 105. In one embodiment, the APIs for each application are stored as a logic group, such as a domain. For example, the APIs for APP 1 262 are stored in a group separate from the APIs for other applications. In one embodiment, each group contains only one type of API for one application. For example, the secure storage APIs for APP 1 262 are may be considered as one group.

The APIs for APP 1 262 show the subgroup of APIs from the entire group of APIs that are specific to Application 1. The SDK was configured to allow the APIs for APP 1 262 to be accessed by Application 1 upon successful authentication (see FIG. 2, step 190). In one embodiment, the APIs for APP 1 262 is the subset of code from the set of code for the SDK that may be called by one or more different applications. In another embodiment the APIs for APP 1 262 may only be called by Application 1 software entity. The APIs for APP 1 262 include secure storage APIs, configuration APIs, DRM APIs, and customized APIs. However, the APIs for APP 1 262 are not limited to only those APIs.

The standard and secure storage APIs 340 contain the APIs needed for an application or an application launcher 105 to retrieve and store content on the secure memory device 145, to establish a secure session, or to perform any other type operations involving access and storage of content on the secure memory device 145. For example, a standard or secure storage API 340 may be an API that allows an application 105 to send a path location for content requested for access to the host file system 130 or the secure file system 135. The application 105 may call a standard API from the group of standard and secure APIs 340 when accessing public content and may call a secure API from the group of APIs for APP 1 262 after Application 1 is authenticated with the peripheral device SDK security layer 125, such as secure peripheral device API 120 shown in FIG. 7.

The authentication APIs 350 are APIs used to authenticate an application 105, and it is open to all applications without requiring an authentication process for access to authentication APIs 350. The authentication APIs 340 are called by the application 105. When an authentication API 340 is called by an application 105, the application 105 can send a credential to the peripheral device SDK security layer 125 using the authentication API 340. The peripheral device SDK security layer 125 will then verify if the credential sent by the application 105 through the authentication API 340 is valid. The credential can be any type of credential used to authenticate a software entity, such as a response to a challenge/response authentication algorithm, a PKI certificate, a PIN, a key, a password, etc. In the case of the challenge/response authentication, the authentication API 350 may be used to send a challenge to the application 105. The response to the challenge may then be sent from the application 105 to the peripheral device SDK security layer 125 using the same authentication API 340.

The configuration APIs 360 are the APIs used to allow the application 105 to configure the secure memory device 145 or to retrieve information about the configuration of the secure memory device 145. This may only occur if the application 105 has the appropriate authority to do so. For example, the configuration APIs 360 may be called by a specific application 105 to obtain information about the used and free memory space on the secure memory device 145 or to create a new secure partition after the application 105 is successfully authenticated.

The DRM APIs 370 may be called by the application 105 to access the permissions or digital rights associated with content and provide access to that content if the rights are valid. The validation of these rights would occur in the DRM module 315 in the firmware module 210 in the secure memory device 145. In one embodiment, the DRM APIs 370 may be specific to a particular application 105, such as shown in the subgroup of APIs for APP 1 262.

The customized APIs 380 may be any additional APIs a user may require for operation of the secure memory device 145 in the host device 100. The customized APIs 380 may be specific to a particular application 105, such as shown in the subgroup of APIs for APP 1 262.

Figure 13:
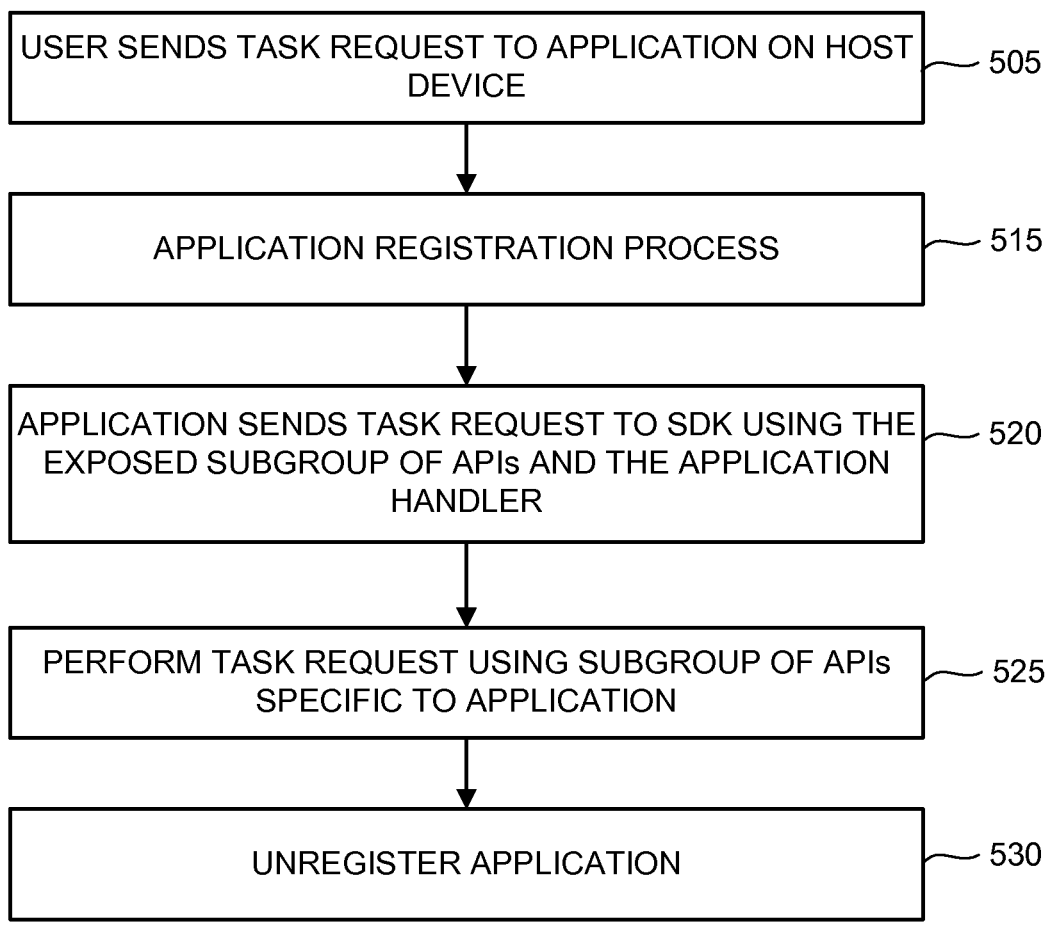
FIG. 13 is a flow chart describing one process for accessing a secure peripheral device.

FIG. 13 is a flow chart describing an example of how a host device can be operated with the secure peripheral device after the peripheral device SDK is properly installed on the host device (step 180 of FIG. 4). More specifically, FIG. 13 is a process describing how a task request associated with the secure peripheral device and sent by a user through an application on the host device is performed. For example, a task request can be a request to access or store content on the secure peripheral device, including accessing and storing files (e.g. music, applications, etc.), accessing information associated with the secure peripheral device (e.g. the amount of free memory space), changing content for configuration of the secure memory device, or accessing DRM information (e.g. digital rights objects). The user may request this task via an application on the host device. In the following example, a secure memory device will be used as the secure peripheral device. However, note that the secure peripheral device is not limited in its use or configuration as provided such this example.

In step 505 of FIG. 13, a user may send a task request to an application 105 on the host device 100. The task request is received from the application 105 at the peripheral device SDK security layer 125 (step 505).

In step 515, the peripheral device SDK security layer 125 will perform a registration process for the application 105. The registration process is the process for authenticating the application 105 and registering the application 105 in the internal registration table 285 (shown in FIG. 7) if the authentication is successful. If the registration is successful, the peripheral device SDK will send an indication to the application 105. The indication indicates that the APIs specific to the registered application 105 are exposed. The peripheral device SDK security layer 125 also sends an application handler to the application 105. The application handler is used as an added security measure. Each time the application 105 communicates with the peripheral device 145 using an exposed API, the application 105 must also send the application handler to the peripheral device via the API. More detail about the registration process will be described in FIG. 14.

If the registration process of step 515 is successful, the application 105 will send the task request to the peripheral device SDK 330 through one or more of the APIs exposed during the registration process (step 520). The task request must be sent with the application handler given to the application 105 during the registration process.

Figure 18:
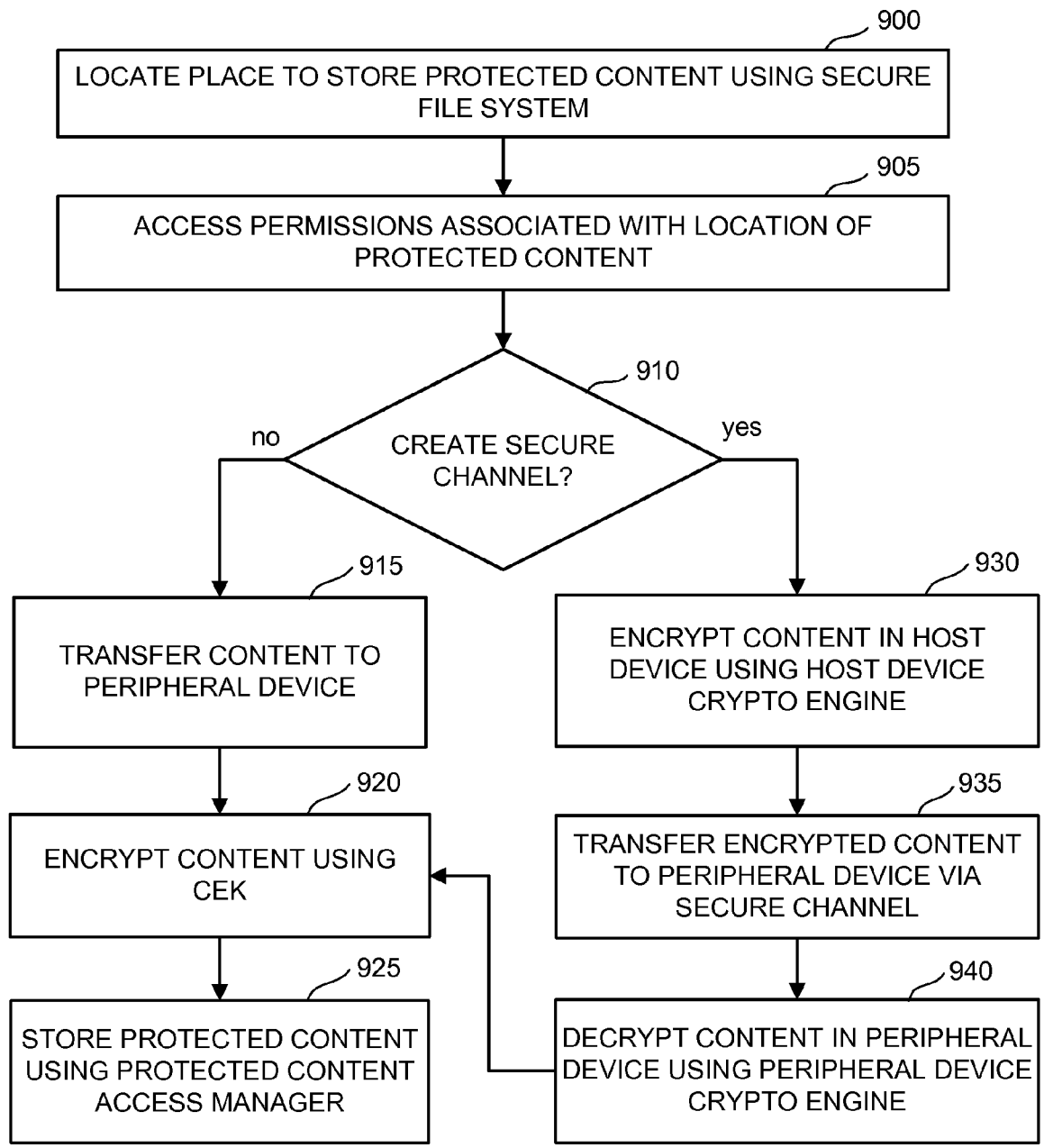
FIG. 18 is a flow chart describing one embodiment of a process for storing protected content on a memory device.
Figure 19:
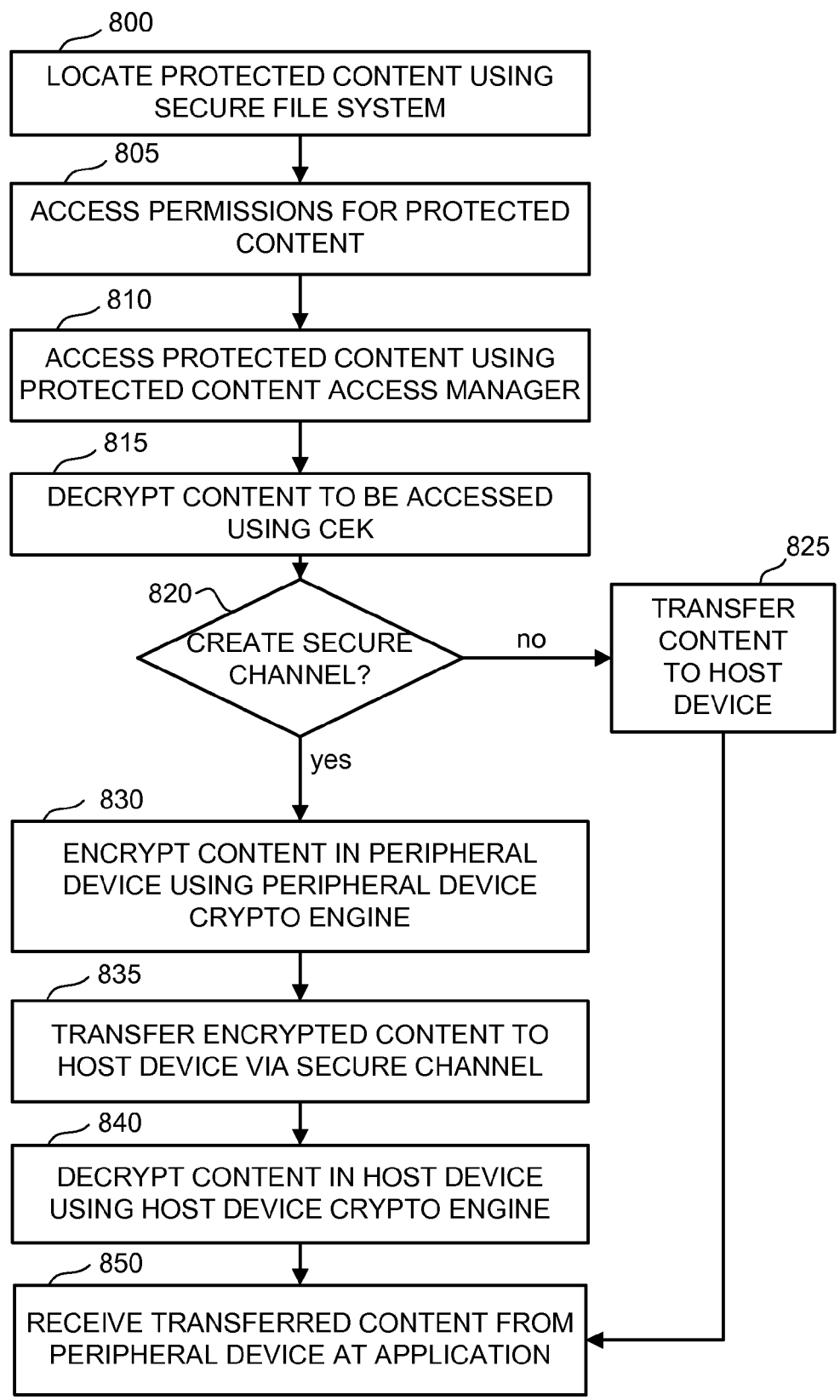
FIG. 19 is a flow chart describing one embodiment of a process for accessing protected content on a memory device.

In step 525, the peripheral device SDK 330 will perform the task request using the exposed subgroup of APIs specific to the application 105. FIG. 18 describes an example of how this step is performed for storage of protected content in a secure memory device. FIG. 19 describes an example of how this step is performed for access of protected content stored in a secure memory device.

Figure 20:
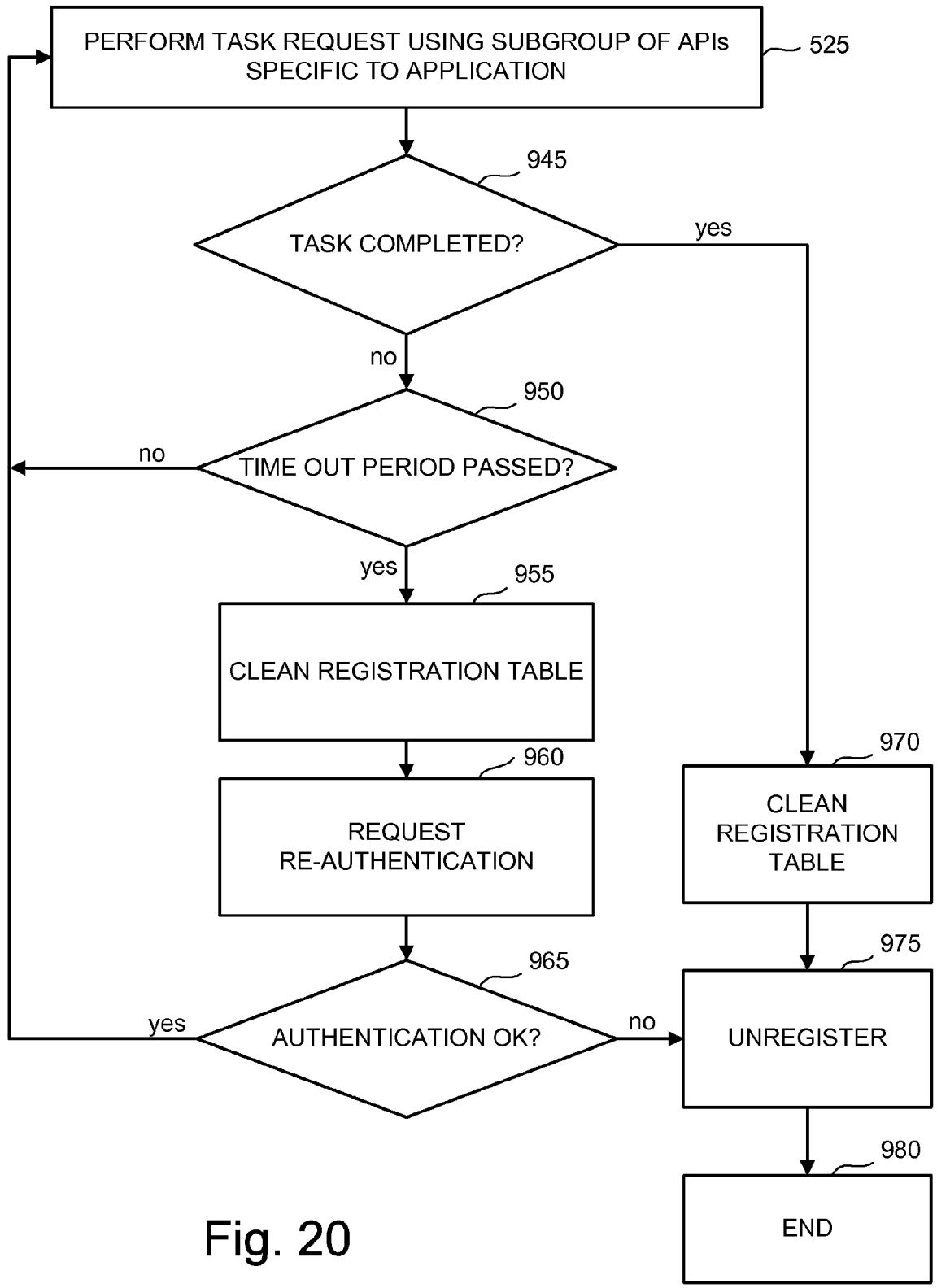
FIG. 20 is a flow chart describing one embodiment of a process for unregistering a software entity.

Once the task request is completed in step 525, the peripheral device SDK security layer 125 will unregister the application 105 from the internal registration table 285 in step 530. FIG. 20 describes how this step is performed in more detail.

Figure 14:
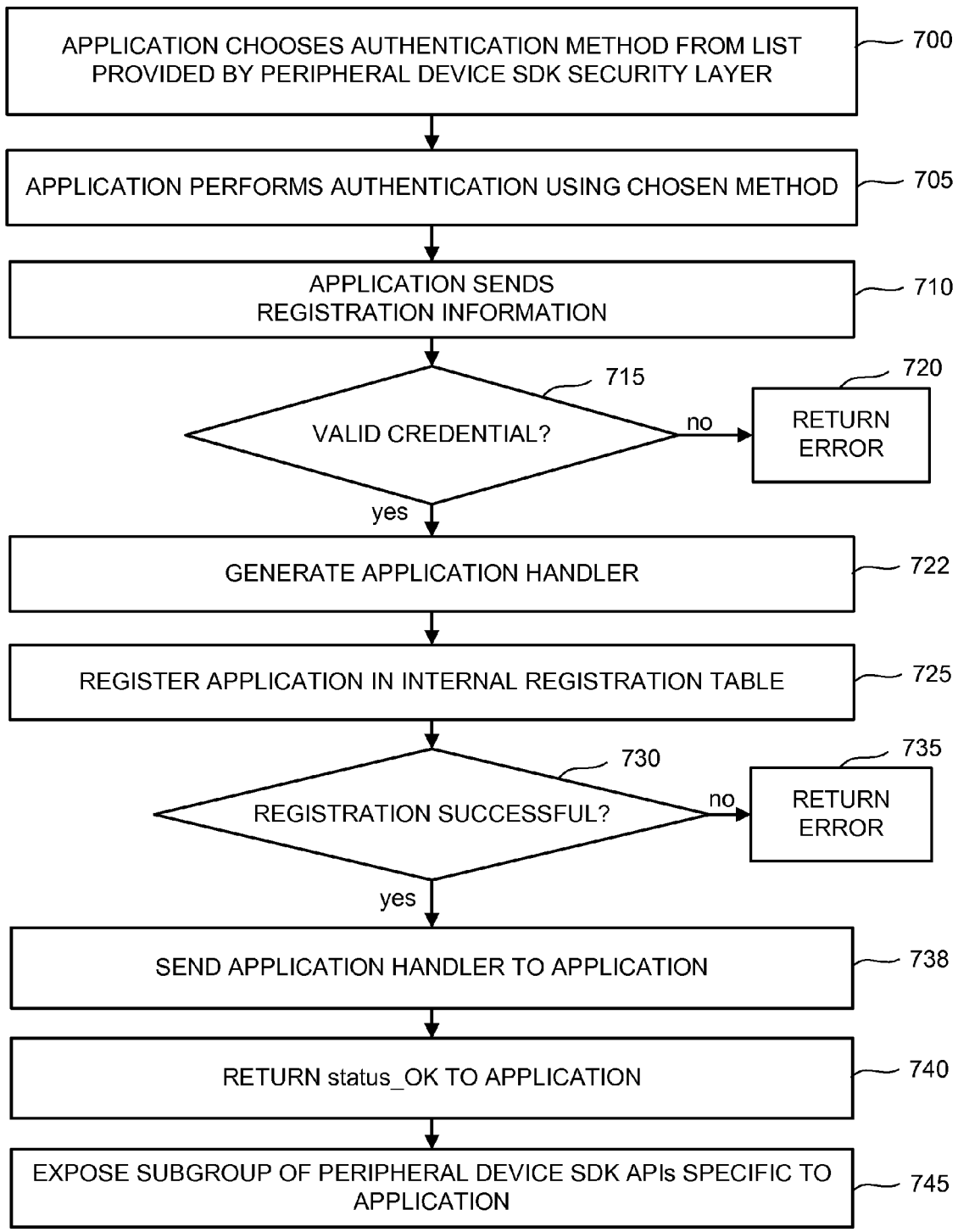
FIG. 14 is a flow chart describing one embodiment of a process for registering a software entity on a host device.

FIG. 14 is a flow chart illustrating one example of how the registration process is performed for a task associated with protected content (step 515 of FIG. 13). In step 700, after a user sends a task request to the application 105, the application 105 will choose an authentication method from a list of authentication method options. The list of authentication method options is provided to the application 105 by peripheral device SDK security layer 125 through an authentication API. The API for providing such a list can be defined, for example, as:

void ListAuthenMethod(char*AppID, char*AuthList).

The ListAuthenMethod API may provide the peripheral device SDK security layer 125 with the application ID (char*AppID) for the application 105. The application ID is the unique identifier associated with the application 105. The peripheral device SDK security layer 125 will return a list of authentication methods (char*AuthList) supported by the peripheral device SDK 125. The application 105 will then choose which authentication method to use from the list provided by the peripheral device SDK security layer 125 based on the authentication method the application 105 is programmed to use.

In step 705, the application 105 will perform the chosen authentication method by acquiring the appropriate credential for the chosen authentication method. For example, if the chosen authentication method is PKI-based, the application 105 will perform the authentication method by retrieving its PKI certificate as its credential. If the chosen authentication method is a challenge/response authentication method, the application 105 will perform the authentication method by calling the challenge/response API stored with the authentication APIs 350 in the memory device SDK 330. The application 105 will receive the challenge from the peripheral device SDK security layer 125 using the challenge/response API. The challenge can be a random number generated by the host device crypto engine 185 or the memory device crypto engine 160. The application 105 will then calculate the appropriate response to the challenge as its credential. More detail about how different authentication methods are performed is discussed in the description for FIGS. 15A-C.

In step 710, the application 105 will send the registration information to the peripheral device SDK security layer 125 by calling a registration API. The API for registering the application can be defined, for example, as:

uchar    RegisterApplication(char*AppID, char*AuthMethod, uchar*credential, uchar credentialLen).

The RegisterApplication API may allow the application 105 to send its application ID (char*AppID), the chosen authentication method (char*AuthMethod), the credential (uchar*credential), and the length of the credential (uchar credentialLen) retrieved in step 705 to the peripheral device SDK security layer 125 using the RegisterApplication API. The credential length should be provided to support different credential lengths that different authentication methods may require.

In step 715, the peripheral device SDK security layer 125 will check to see if the credential is valid. If the credential is not valid, the peripheral device SDK security layer 125 will return an error to the application 105 (step 720).

If the credential is valid, in step 722, the peripheral device SDK security layer 125 will generate an application handler for the application 105. The application handler is a unique random number that is generated using any predefined cryptographic algorithm, such as HASH, for example. The application handler will be generated by inputting particular values into the predefined cryptographic algorithm. These particular values can be any values associated with the application 105 and/or the registration information for the application 105, such as the application ID, the time that the application 105 is registered, the amount of time that the application 105 can be registered, or the registration status, for example. All peripheral device SDK APIs contain an input parameter for an application handler. In one embodiment, a default application handler can be generated and used for APIs that are open to all applications. However, as previously described, the authentication APIs 350 are open to all applications and no application handler is required for accessing these APIs for authentication.

Once the application handler is generated, the peripheral device SDK security layer 125 will register the application 105 in an internal registration table 285 managed by the peripheral device SDK security layer 125 (step 725). The internal registration table 285 contains information for authenticated applications and application launchers. For applications and application launchers that have been successfully authenticated with the peripheral device SDK security layer 125, the peripheral device SDK security layer 125 will record information in the internal registration table 285, such as the application handler, a time out period for the application 105 indicating an amount of time that the authenticated application can remain registered in the internal registration table 285 (e.g. the registration time+the amount of time the application can be registered), the APIs the application 105 can access, or any other information. The internal registration table 285 is used to keep track of authenticated applications and application launchers so that those authenticated applications and application launchers do not have to re-authenticate each time a task request is received while the authenticated applications and application launchers are registered in the authentication table.

In step 730, the peripheral device SDK security layer 125 checks if the application 105 is successfully registered in the internal registration table 285. If the application 105 is not successfully registered in the internal registration table 285, the peripheral device SDK security layer 125 will return an error to the application 105 (step 735).

If the application 105 is successfully registered in the internal registration table 285, the peripheral device SDK security layer 125 will return the application handler generated in step 722 to the application 105 (step 738) via the authentication API. The peripheral device SDK security layer 125 will also return an indication to the application 105 indicating that the registration was successful, such as status_ok (step 740). The status_ok indication lets the application 105 know that the subgroup of APIs specific to the application 105 and needed to perform the task will be exposed for use by the application 105.

In step 745, the peripheral device SDK security layer 125 will then expose the subgroup of APIs from the peripheral device SDK 330 to the application 105, such as the subgroup 262 shown in FIG. 12. This subgroup of APIs will allow the application 105 to communicate with the secure peripheral device 145. However, access to this portion of code is only allowed if the application 105 provides a valid application handler after authentication. This subgroup of APIs allows the application 105 to perform the task request by creating the proper link between the application 105 and the secure peripheral device 145.

Figure 15A:
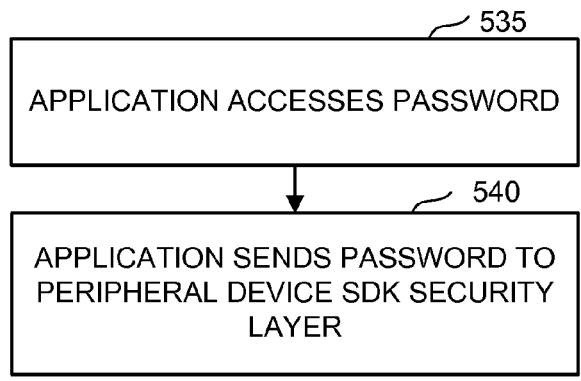
FIGS. 15A-C are flow charts for different authentication methods that the SDK can perform.
Figure 15B:
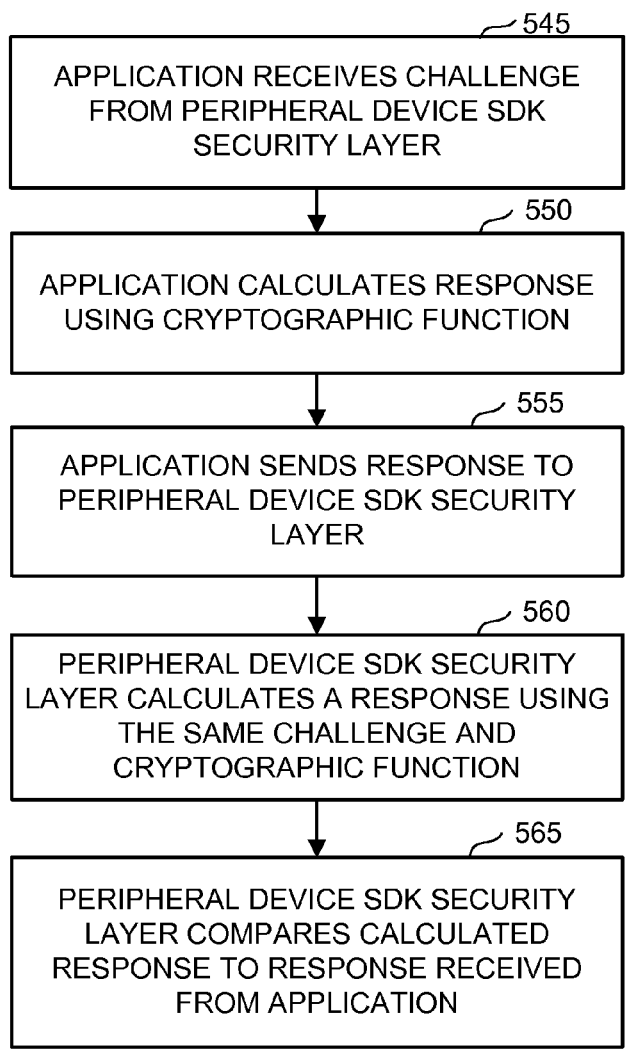
Figure 15C:
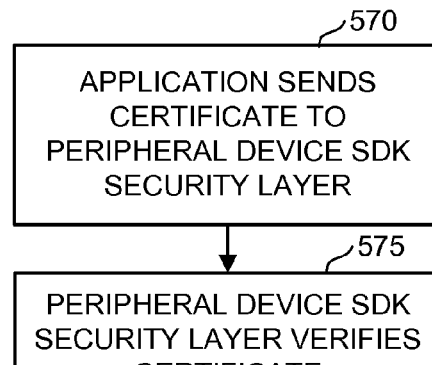
Figure 15C:
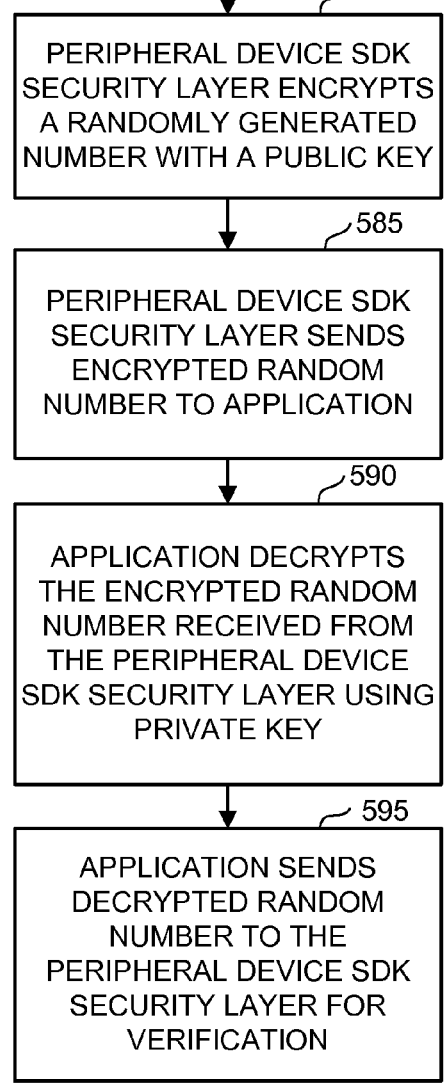

FIGS. 15A-C show examples of process for performing different types of authentication methods supported by the peripheral device SDK security layer 125 (steps 710 and 715 of FIG. 14). FIG. 15A is a flow chart of one example of a process of performing a password-based authentication. The application 105 is programmed with a password that can be used for authentication. In step 535 of FIG. 15A, the application 105 accesses the password that the application 105 was programmed to use. The application 105 will send the password to the peripheral device SDK security layer 125 via an authentication API. The peripheral device SDK security layer 125 will then continue with the process of FIG. 14 by checking to see if the password is valid (step 715 of FIG. 14).

FIG. 15B is a flow chart of one example of a process of performing a challenge-response based authentication. In step 545, the application 105 receives a challenge from the peripheral device SDK security layer 125 via an authentication API. For example, the form of the API can be void GetChallenge(char*AppID, uchar*challenge, uchar*challengeLen). The API GetChallenge may allow the application 105 to provide the peripheral device SDK security layer 125 with its application ID (char*AppID). The peripheral device SDK security layer 125 may then return the challenge (uchar*challenge) as well as the length of the challenge (uchar*challenge) to the application 105.

In step 500, the application 105 will calculate a response by inputting the received challenge into a cryptographic function that the application 105 was programmed to use. In step 555, the application 105 will send the calculated response to the peripheral device SDK security layer 125. The peripheral device SDK security layer 125 will also calculate a response using the same challenge in the same cryptographic function (step 560) and compare that calculated response with the response received from the application 105 (step 565). This comparison step is how the peripheral device SDK security layer 125 checks if the credential (e.g. the response from the application 105) is valid (step 715 of FIG. 14). The registration process of FIG. 14 can continue based on this credential.

FIG. 15C is a flow chart of one example of a process for performing a PKI-based authentication of the application 105. In step 570, the application 105 sends a certificate to the peripheral device SDK security layer 125. The certificate is part of the credential that is stored with the application 105. The application 105 is programmed to provide this certificate through an authentication API.

In step 575, the peripheral device SDK security layer 125 will verify the certificate. In step 580, if the certificate is valid, the peripheral device SDK security layer 125 will encrypt a randomly generated number with a public key retrieved from the certificate sent by the application (step 570). The random number could be generated and encrypted using the SDK crypto library 168. The encrypted random number is then sent from the peripheral device SDK security layer 125 to the application 105 (step 585).

In step 590, the application 105 will decrypt the encrypted random number received from the peripheral device SDK security layer 125 using a private key associated with the public key used by the peripheral device SDK security layer 125. Authorized applications are able to decrypt the encrypted random number because they have the correct private key. In step 590, the application 105 will send the decrypted random number to the peripheral device SDK security layer 125 for verification (step 715 of FIG. 14). At that point, the process of FIG. 14 can be continued.

Figure 16:
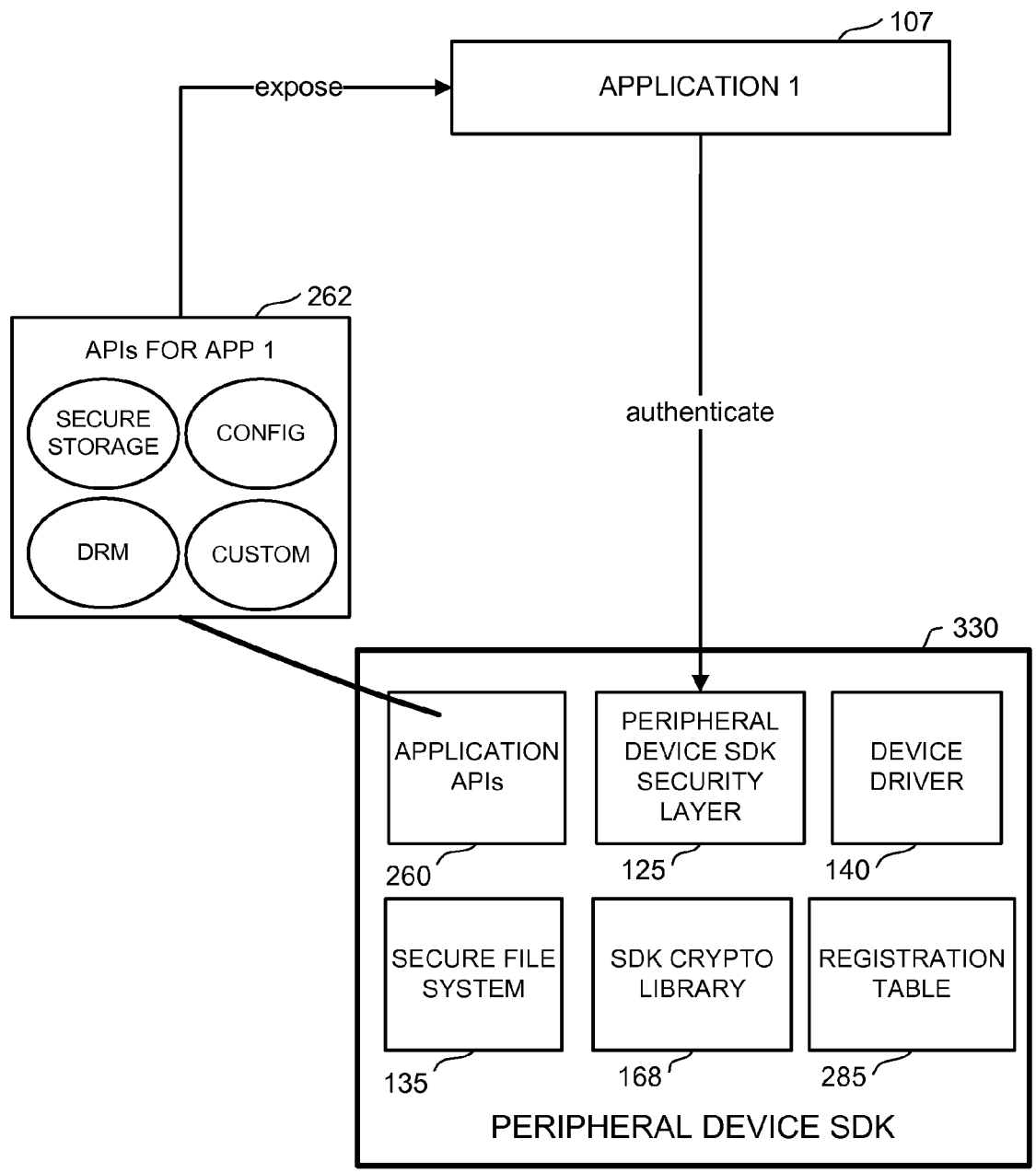
FIG. 16 depicts one example of the registration process.

FIG. 16 depicts a block diagram of an example of the registration process of FIG. 12. Application 1 107 will first perform an authentication method (step 705 of FIG. 12) using the chosen authentication method from the list provided by the peripheral device SDK security layer 125 in step 700 of FIG. 14 and send the registration information to the peripheral device SDK security layer 125 within the peripheral device SDK 330 (step 710). If the peripheral device SDK security layer 125 determines that the credential is valid (step 715), the peripheral device SDK security layer 125 will generate an application handler for Application 1 (step 722), register Application 1 107 in the internal registration table 285 (step 725), and expose the subgroup of APIs for APP 1 262 to Application 1 107 (step 745).

Figure 17:
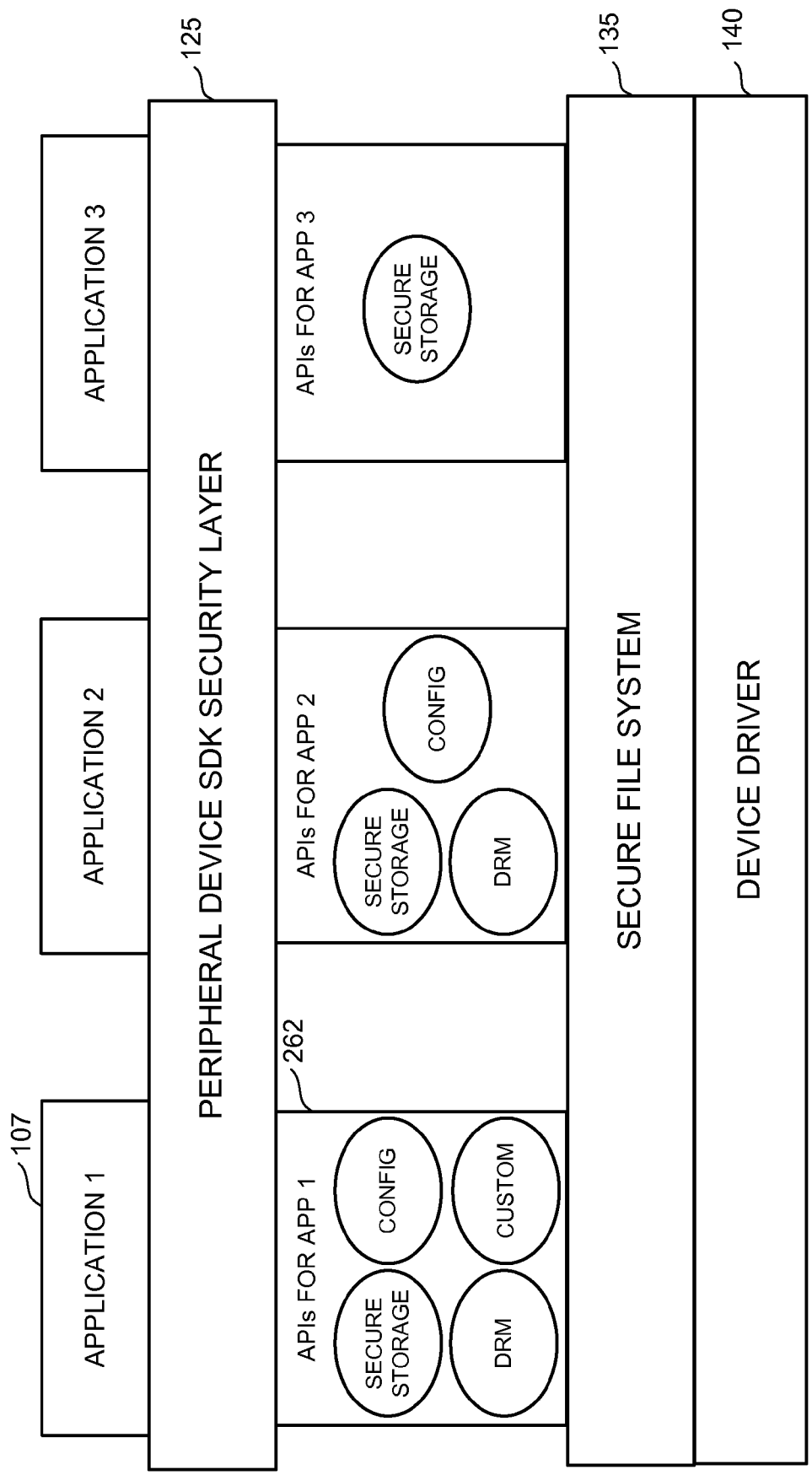
FIG. 17 depicts one example of software entities successfully registered on a host device.

FIG. 17 depicts an example of software layers for several authenticated applications requesting access to a secure memory device 145. Different APIs are accessible based on how the SDK was configured for each application, as described in step 190 of FIG. 2. For example, after Application 1 107 has been successfully authenticated with the peripheral device SDK security layer 125 and registered in the internal registration table 285, Application 1 107 will have access to the subgroup of APIs for Application 1 262. For example, Application 1 107 may call those APIs to securely store and access protected content on a secure memory device 145, configure the secure memory device 145, etc. The APIs for APP 1 262 will provide the appropriate interface so Application 1 can perform the requested tasks for protected content through the secure file system 135 and the device driver 140. In the case of Application 1 107, the SDK was configured to provide a full set of functions for access to each of the APIs for APP 1 (see step 190 of FIG. 2).

Application 2 and Application 3 are examples of other applications that have been successfully authenticated with the file system filter 125 and registered in the internal registration table 285. Application 2 may access and store protected content through the secure file system 135 and the device driver 140 using the subgroup of APIs for APP 2, such as the secure storage APIs and the DRM APIs, and may also configure the secure memory device 145 using the configure APIs in the SDK. However, Application 2 may not have access to any custom APIs within the SDK. The APIs that Application 2 is allowed to access are based on the SDK configuration as described in step 190 of FIG. 2. Similarly, Application 3 may access and store protected content through the secure file system 135 and the device driver 140 using the subgroup of APIs for APP 3. However, Application 3 does not have access to the configuration, DRM, and custom APIs within the SDK, as the SDK was not configured to allow Application 3 to access these APIs in step 190 of FIG. 2.

Continuing with the example of a secure memory device as the peripheral device, FIG. 18 is a flow chart describing one example of how the peripheral device SDK 330 performs the task of storing protected content in the secure memory device 145 (step 525 of FIG. 13). In step 900, once the registration process of FIG. 13 is complete and the task request has been sent using one or more of the exposed APIs, the peripheral device SDK 330 will direct the secure file system 135 for the secure memory device 145 to locate a place to store the protected content in the secure memory device 145. The application 105 may call one of the APIs from the subgroup of APIs that was exposed in step 745 of FIG. 14 to provide the desired storage location for the secure file system 135.

In step 905, the peripheral device SDK 330 will access the permissions associated with the storage location where the protected content is to be stored, such as a session key for creating a secure channel 155. In step 910, the peripheral device SDK 330 will determine whether a secure channel should be used to transfer the protected content based on the permissions accessed in step 905.

If the peripheral device SDK 330 determines that a secure channel should not be used, the protected content will be transferred from the host storage manager 110 on the host device 100 to the secure memory device 145 through an open channel 150 (step 915). The application 105 may transfer this content by calling one of the APIs from the subgroup of APIs exposed in step 745 of FIG. 14. The protected content access manager 320 will access the CEK for the storage location and direct the peripheral device crypto engine 160 to encrypt the content using the CEK and the crypto engine library 235 (step 920). The protected content access manager 320 will then store the encrypted protected content in the appropriate storage location (step 925).

If in step 910 the peripheral device SDK 330 determines that a secure channel 155 should be used, the peripheral device SDK 330 will receive the content from the application 105 through one of the APIs in the subgroup of exposed APIs and direct the SDK crypto engine 168 to encrypt the protected content within the host device 100 using the session key and the appropriate cryptographic scheme (step 930). In step 935, the encrypted content will be transferred from the host storage manager 110 on the host device 100 to the secure memory device 145 through a secure channel 155. The peripheral device crypto engine 160 will then decrypt the transferred protected content in the secure memory device 145 and the crypto engine library 235 (step 940).

In step 920, the protected content access manager 320 will access the CEK for the storage location where the protected content is to be stored and direct the peripheral device crypto engine 160 to encrypt the content using the CEK and the crypto engine library 235. The protected content access manager 320 will then store the encrypted protected content in the appropriate storage location (step 925).

FIG. 19 is a flow chart describing one example of how the peripheral device SDK security layer 125 performs the task of accessing protected content stored in the secure memory device 145 (step 525 of FIG. 13). In step 800, once the registration process of FIG. 13 is complete and the task request has been sent using one or more of the exposed APIs, the peripheral device SDK security layer 125 will direct the secure file system 135 to locate the requested protected content in the appropriate location of the secure memory device 145. The application 105 may call one of the APIs from the subgroup of APIs that was exposed in step 745 of FIG. 14 to provide the desired storage location for the secure file system 135.

The protected content access manager 320 accesses the permissions associated with the location of the protected content, including the CEK and the session key (step 805). The secure content access manager 320 then accesses the protected content from the location in the secure memory device 145 (step 810) and directs the peripheral device crypto engine 160 to decrypt the content using the CEK and the crypto engine library 235 (step 815).

In step 820, the protected content access manager 320 then determines whether the protected content should be transferred to the host storage manager 110 on the host device 100 using a secure channel. If the session key accessed in step 805 indicates that the protected content should be transferred using an open channel 150, the protected content access manager 320 will transfer the content to the host storage manager 110 on the host device 100 through the open channel 150 (step 825).

If in step 820, the protected content access manager 320 determines that the protected content should be transferred to the host storage manager 110 on the host device 100 using a secure channel 155, the protected content access manager 320 will direct the peripheral device crypto engine 160 to encrypt the protected content within the secure memory device 145 using the session key (step 830). The protected content access manager 320 will then transfer the encrypted protected content to the host storage manager 110 on the host device 100 through the secure channel 155 (step 835). Once the protected content is transferred, the SDK crypt library 168 will be used to decrypt the protected content using the same session key (step 840).

After the protected content is successfully transferred (step 825 and step 835) and decrypted if necessary (step 840), the application 105 will receive the requested protected content (step 850). The application 105 will receive the requested protected content using one of the APIs from the subgroup of APIs exposed in step 745 of FIG. 14.

FIG. 20 is a flow chart describing one example of how the application 105 is unregistered from the internal registration table 285 in the peripheral device SDK security layer 125 (step 530 of FIG. 13). In step 945, the peripheral device SDK security layer 125 will check to see if the task has been completed. If the task has been completed, the peripheral device SDK security layer 125 will clean the registration table 285 of any information associated with the application 105

(step 970). The peripheral device SDK security layer 125 will then unregister the application 105 from the internal registration table 285 (step 975). The step of unregistering the application 105 can be performed by calling the appropriate API, such as uchar UnRegisterApplication(char*AppID), for example. This API will unregister the application 105 by removing the corresponding application ID from the internal registration table 285. The process of performing the requested task is then ended (step 980).

If the task is not yet complete, while the task request is performed (step 525), the peripheral device SDK security layer 125 checks to see if the application 105 has been registered for the amount of time indicated in the internal registration table 285 for the time out period (step 950). If the time out period has passed, the peripheral device SDK security layer 125 will clean the registration table 285 of any information associated with the application 105 (step 955). The peripheral device SDK security layer 125 will then request re-authentication of the application 105 (step 960). An authentication process similar to FIG. 14 can be used for re-authentication of application 105. The peripheral device SDK security layer 125 will determine if the re-authentication was successful (step 965). If re-authentication is successful, the task will continue to be performed (step 525). If the re-authentication is unsuccessful, the peripheral device SDK security layer 125 will unregister the application 105 from the internal registration table 285 by calling the appropriate API, such as uchar UnRegisterApplication(char*AppID) (step 975). This API will unregister the application 105 by removing the corresponding application ID from the internal registration table 285. The process of performing the task will then end (step 980).

If in step 950 the peripheral device SDK security layer 125 determines that the time out period in the internal registration table 285 has not passed, the peripheral device SDK security layer 125 will continue performing the task request in step 525.

The foregoing detailed description of various embodiments is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. The foregoing description is not intended to thereby limit the scope of the invention as recited in claims appended hereto.

What is claimed is:

1. A host device configured to communicate with a storage device local to the host device, the host device comprising:
    a first software entity;
    plural sets of code configured for the host device to communicate with the storage device local to the host device, one set of the plural sets of code customized to the first software entity;
    one or more processors adapted to:
        receive a request from the first software entity to communicate with the storage device, wherein the request comprises a request to store content in or retrieve the content from the storage device,
        in response to receiving the request by the first software entity to communicate with the peripheral storage device, determine whether the host device previously authenticated the first software entity as valid by accessing a table of software entities previously authenticated by the host device,
        in response to determining that the first software entity was previously authenticated by the host device to be valid, enable the first software entity to use at least a part of the one set of code, the at least a part of the one set of code used to allow the first software entity to communicate with and verify itself to the storage device, and
        communicate with the storage device using the one set of code to send the content to or retrieve the content from the storage device.

2. The host device according to claim 1, wherein the request comprises a task request from the first software entity; and
    wherein the one or more processors are configured to enable the first software entity to use the at least a part of the one set of code by performing the task request when the one or more processors are programmed with the at least a part of the one set of code.

3. The host device according to claim 1, wherein the one or more processors are configured to:
    determine whether a credential from the first software entity is verified as valid by:
        providing one or more authentication options to the first software entity; and
        receiving a response that indicates one of the one or more authentication options from the first software entity, the one or more processors verify the credential based on the response,
    in response to determining that the credential from the first software entity is verified as valid, update the table of software entities to indicate that the first software entity was authenticated.

4. The host device according to claim 3, wherein the one or more processors are further configured to return an error to the first software entity if the credential is not valid.

5. The host device according to claim 3, wherein the storage device is physically connected to the host device via a physical interface on the host device; and
    wherein the one or more processors are configured to enable the first software entity to use the at least a part of the one set of code by generating a software entity handler using an identifier associated with the first software entity in a cryptographic function if the credential is verified to be valid, the software entity handler configured to provide access to the one set of code.

6. The host device according to claim 1, wherein the one or more processors are configured to enable the first software entity to use the at least a part of the one set of code by sending a software entity handler to the first software entity, the software entity handler configured to provide access to the one set of code.

7. The host device according to claim 5,
    wherein the one or more processors are further configured to:
        register the first software entity in the table of software entities if the credential is valid;
        register the software entity handler in the table if the credential is valid;
    wherein the one or more processors are configured to determine whether the credential for the first software entity is verified as valid by reviewing the table of software entities.

8. The host device according to claim 7, wherein:
    the one or more processors are further configured to send an indication to the first software entity if the software entity is successfully registered, the indication indicates that the one set of code is exposed.

9. The host device according to claim 7, wherein:
the one or more processors are configured to allow the first software entity to perform tasks associated with the storage device using the software entity handler while the first software entity is registered in the table if the one or more processors are programmed with the at least a part of the one set of code.

10. The host device according to claim 7, wherein:
the one or more processors are configured to register permissions associated with the first software entity in the table, the permissions indicate the one set of code the first software entity can access.

11. The host device according to claim 7, wherein:
the one or more processors are configured to unregister the first software entity if the first software entity is registered in the table for a predetermined amount of time indicated in the table.

12. The host device according to claim 7, wherein:
the one or more processors are configured to receive a task request from the first software entity;
the one or more processors are configured to perform the task request when the one or more processors are programmed with the at least a part of the one set of code; and
the one or more processors are configured to unregister the first software entity from the table after the task request is performed.

13. The host device according to claim 1, wherein:
the storage device local to the host device is a peripheral flash memory device.

14. The host device according to claim 3, wherein:
the one or more processors are configured to receive a request to store content in a group of the storage device, the request is received from the first software entity; and
the one or more processors are configured to enable the first software entity to use the at least a part of the one set of code by accessing an encryption key associated with the group if the credential is valid.

15. The host device according to claim 3, wherein:
the request comprises a request to access content in a group of the storage device, the request is received from the first software entity; and
the one or more processors are configured to enable the first software entity to use the at least a part of the one set of code by accessing an encryption key associated with the group if the credential is valid.

16. The host device according to claim 1, wherein the request comprises a request to store content in a partition in the storage device; and
wherein in response to determining that the first software entity is authenticated, the one or more processors are adapted to:
access an encryption key associated with the partition,
encrypt the content using the encryption key, and
communicate the encrypted content using the at least a part of the one set of code.

17. The host device according to claim 1, wherein the one set of code comprises symmetric encryption code.

18. A host device for accessing a memory device local to the host device, comprising:
a cryptographic engine, the cryptographic engine configured to verify a credential from a first software entity on the host device; and
one or more processors on the host device in communication with the cryptographic engine, the one or more processors are configured to:
intercept request by the first software entity to communicate with the memory device local to the host device, the memory device in communication with the host device, wherein the request comprises a request to store content in or retrieve the content from the memory device,
access a table of software entities previously authenticated by the host device in order to determine whether the first software entity is authenticated,
in response to determining that the first software entity is authenticated, expose code customized to the first software entity,
enable the first software entity to use the code in order for the first software entity to verify itself to the memory device and to access the memory device when the one or more processors are programmed with the code, and
communicate with the memory device using the code to send the content to or retrieve the content from the memory device.

19. The host device according to claim 18, wherein:
the one or more processors are configured to provide one or more authentication options to the first software entity;
the one or more processors are configured to receive a selection of the one or more authentication options from the first software entity; and
the cryptographic engine is configured to verify the credential based on the selection.

20. The host device according to claim 18, wherein:
the one or more processors are configured to register the first software entity in the table of software entities if the credential is valid; and
the one or more processors are configured to allow communication between the first software entity and the memory device while the first software entity is registered in the table.

21. A method for providing access to a storage device local to the host device, comprising:
in a host device having a plurality of sets of code used to communicate with the storage device local to the host device, the host device performing:
receiving a request from a first software entity to communicate with the storage device, wherein the request comprises a request to store content in or retrieve the content from the storage device;
in response to receiving the request from the first software entity to communicate with the storage device, accessing a table of software entities previously authenticated by the host device in order to determine whether the first software entity on the host device is authenticated;
in response to determining that the first software entity is authenticated, allowing the first software entity access to one set of code from the plurality of sets of code used to communicate with the storage device on the host device, the one set of code customized to the first software entity and used to allow the first software entity to communicate with and verify itself to the storage device; and
communicating with the storage device using the one set of code to send the content to or retrieve the content from the storage device.

22. The method according to claim 21, wherein the one set of code is dedicated to the first software entity communicating with the storage device; and
wherein allowing the first software entity access to one set of code comprises allowing access to device driver code and application programming interface code.

23. The method according to claim 21, further comprising:
receiving a task request from the first software entity at the one set of code; and
performing the task request using at least a part of the one set of code.

24. The method according to claim 21, wherein determining whether the first software entity is authenticated comprises:
receiving a credential from the first software entity; and
verifying the credential, the verifying is performed by the one set of code.

25. The method according to claim 24, further comprising:
providing one or more authentication options to the first software entity, the providing is performed by the one set of code; and
receiving a response indicating one of the one or more authentication options from the first software entity, the verifying includes verifying the credential based on the response.

26. The method according to claim 21, further comprising:
returning an error to the first software entity if the first software entity is not successfully authenticated.

27. The method according to claim 21, further comprising:
generating a software entity handler using an identifier associated with the first software entity in a cryptographic function if the first software entity is determined to be authenticated, the software entity handler provides access to the one set of code; and
registering the first software entity using the one set of code if the first software entity is successfully authenticated including registering the software entity handler in the table of software entities.

28. The method according to claim 27, further comprising:
sending the software entity handler to the first software entity, the software entity handler configured to provide access to the at least a part of the one set of code.

29. The method according to claim 27, further comprising:
registering the first software entity using the one set of code if the first software entity is successfully authenticated including registering the software entity handler in the table of software entities.

30. The method according to claim 29, further comprising:
sending an indication that the one set of code is exposed including sending the indication to the first software entity if the first software entity is successfully registered.

31. The method according to claim 30, further comprising:
allowing the first software entity to perform tasks associated with the storage device while the first software entity is registered including allowing the first software entity to perform the tasks using the software entity handler with the one set of code.

32. The method according to claim 29, wherein: registering includes registering permissions associated with the first software entity, the permissions indicate one or more portions of the one set of code the first software entity can access.

33. The method according to claim 29, further comprising:
unregistering the first software entity if the first software entity is registered in the table for a predetermined amount of time indicated in the table.

34. The method according to claim 29, further comprising:
receiving a task request from the first software entity;
performing the task request using at least a part of the one set of code; and
unregistering the first software entity from the table using the one set of code after the task request is performed.

35. The method according to claim 21, wherein:
the storage device is a flash memory device.

36. The method according to claim 21, wherein the request comprises a request from the first software entity to store content in a group of the storage device;
wherein determining whether the first software entity seeks to communicate with the storage device is based on the request;
wherein determining whether the first software entity on the host device is authenticated comprises accessing the table of software entities in order to determine whether the first software entity is authenticated;
further comprising accessing an encryption key associated with the group if the first software entity is successfully authenticated; and
encrypting the content using the encryption key.

37. The method according to claim 21, wherein the one set of code includes a secure peripheral device API,
wherein communicating with the storage device using the one set of code includes using the secure peripheral device API to communicate with the storage device in order to access permissions associated with protected content on the storage device.

* * * * *

UNITED STATES PATENT AND TRADEMARK OFFICE
CERTIFICATE OF CORRECTION

PATENT NO. : 8,621,601 B2
APPLICATION NO. : 12/124456
DATED : December 31, 2013
INVENTOR(S) : Mei Yan et al.

Page 1 of 1

It is certified that error appears in the above-identified patent and that said Letters Patent is hereby corrected as shown below:

On the Title Page

Left column, item (75), replace "Bahman Quwami," with --Bahman Qawami,--.

In the Claims

In column 21, claim 1, line 63, after "communicate with the" delete "peripheral".

Signed and Sealed this
Twenty-ninth Day of April, 2014

Michelle K. Lee
*Deputy Director of the United States Patent and Trademark Office*